(12) United States Patent
Ballatan et al.

(10) Patent No.: US 9,918,025 B2
(45) Date of Patent: Mar. 13, 2018

(54) LICENSE PLATE ILLUMINATOR

(71) Applicants: Peter Ballatan, Tukwila, WA (US);
Andrew Ballatan, Tukwila, WA (US)

(72) Inventors: Peter Ballatan, Tukwila, WA (US);
Andrew Ballatan, Tukwila, WA (US)

( * ) Notice: Subject to any disclaimer, the term of this patent is extended or adjusted under 35 U.S.C. 154(b) by 219 days.

(21) Appl. No.: 14/843,981

(22) Filed: Sep. 2, 2015

(65) Prior Publication Data

US 2017/0064218 A1    Mar. 2, 2017

(51) Int. Cl.
*B60Q 1/56* (2006.01)
*H04N 5/33* (2006.01)
*B60R 13/10* (2006.01)

(52) U.S. Cl.
CPC ............ *H04N 5/33* (2013.01); *B60Q 1/56* (2013.01); *B60R 13/10* (2013.01); *B60R 13/105* (2013.01)

(58) Field of Classification Search
CPC ........................................... B60Q 1/56
USPC ........................................ 362/497
See application file for complete search history.

(56) References Cited

U.S. PATENT DOCUMENTS

| | | | | |
|---|---|---|---|---|
| 9,270,407 | B2* | 2/2016 | Dandrow | H04K 3/822 |
| 2003/0226297 | A1* | 12/2003 | Scudieri, Jr. | B60R 13/10 |
| | | | | 40/209 |
| 2005/0093684 | A1* | 5/2005 | Cunnien | B60Q 1/0023 |
| | | | | 340/435 |
| 2005/0243172 | A1* | 11/2005 | Takano | B60R 1/12 |
| | | | | 348/148 |
| 2011/0252675 | A1* | 10/2011 | Thomas | B60Q 1/503 |
| | | | | 40/205 |
| 2012/0256541 | A1* | 10/2012 | Dandrow | H04K 3/822 |
| | | | | 315/77 |

* cited by examiner

*Primary Examiner* — Christopher Raabe
(74) *Attorney, Agent, or Firm* — Carmen Pili Ekstrom

(57) ABSTRACT

An apparatus and a method for illuminating a license plate comprising a plurality of infrared emitting devices connected in series, parallel or combination thereof mounted on a core material or substrate in a frame. The apparatus emits infrared light in a wavelength responsive to cameras, security camera, road camera, video-photo-radar traffic camera and others. The infrared emitting device is positioned within the perimeter of the license plate. The apparatus is powered by the vehicle power system or a rechargeable power supply.

22 Claims, 19 Drawing Sheets

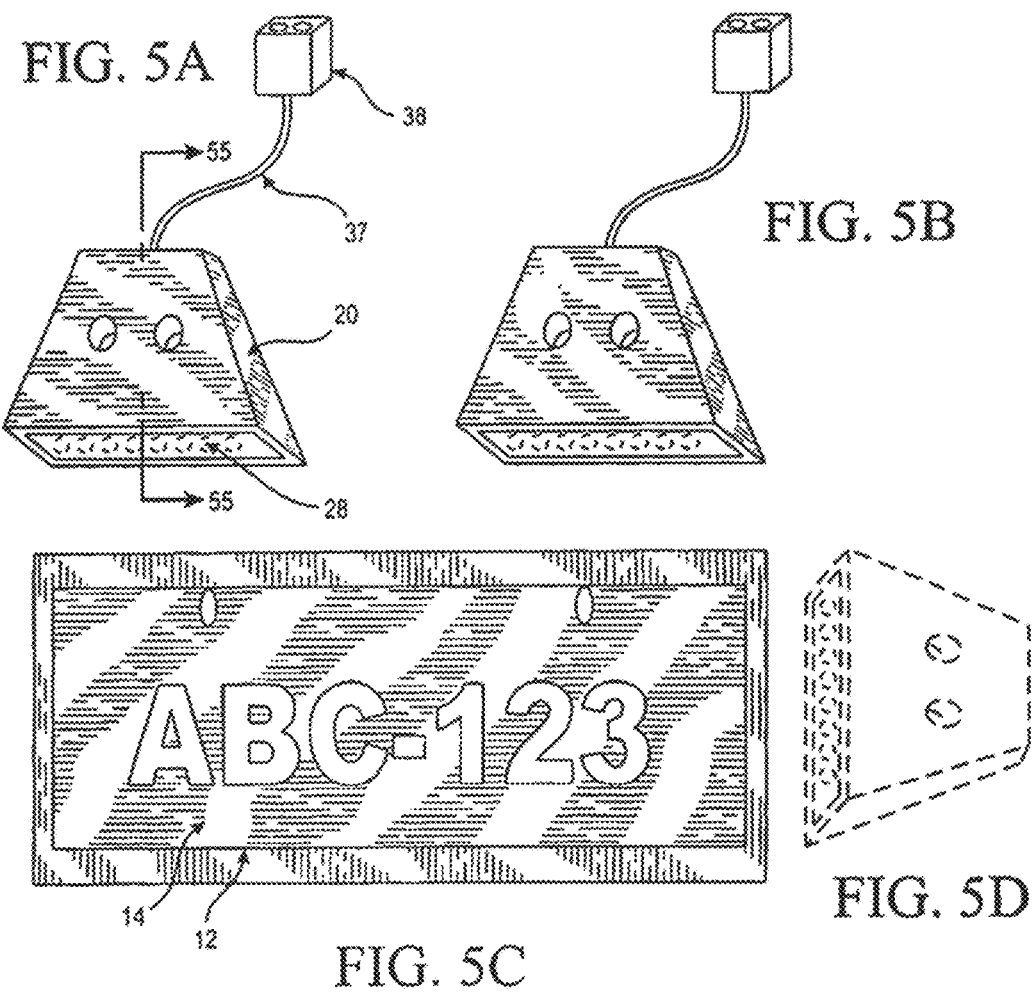
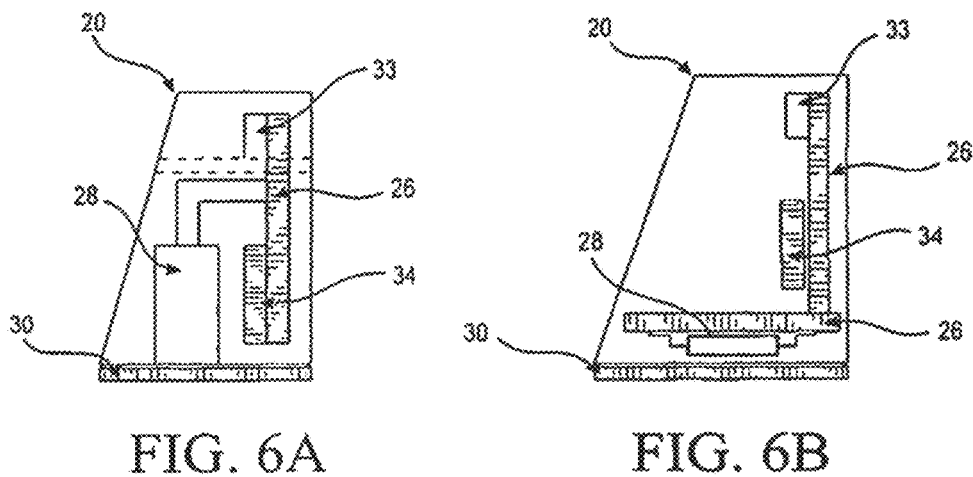

FIG.12 INVENTION SECTION
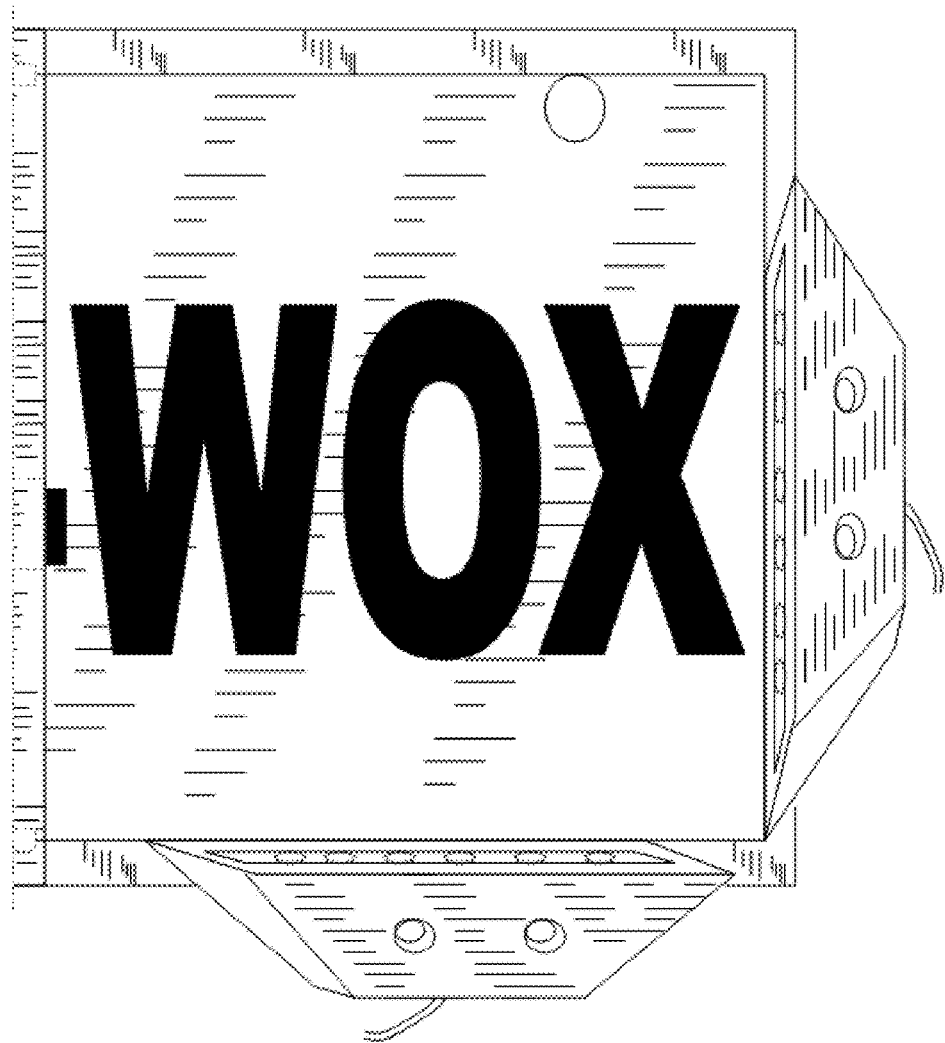

LICENSE PLATE ILLUMINATOR

The application is a continuation-in-part patent application of U.S. patent application Ser. No. 13/341,591 filed on Dec. 30, 2011, the contents of which are incorporated herein by reference. The application claims the benefit of the filing date of U.S. patent application Ser. No. 13/341,591.

FIELD OF INVENTION

The present invention relates generally to an apparatus for illuminating a license plate comprising an infrared light emitting source and components thereof, as well as, a method of using an apparatus for illuminating a license plate comprising an infrared light emitting source. The apparatus can include one or more infrared emitting sources configured to be variably adjusted for illuminating license plates employing one or more infrared light emitting device.

BACKGROUND OF THE INVENTION

After Sep. 11, 2001, the United States Government law enforcement agency, Department of Homeland Security and private citizens have been installing video and surveillance cameras on premises for security, monitoring, and surveillance. Despite all of the cameras installed around the cities, streets and buildings, they are incapable of capturing license plates numbers in a dim light or no light due to insufficient luminance of the license plate and visibility issue. Government regulations for illuminating license plates exist at Federal and State levels. Federal regulations for illuminating license plates are expressed in Federal Motor Vehicle Safety Standards (FMVSS). These standards do not require any minimum ratio of illumination intensity required by a video surveillance camera. A most common standard camera installed these days requires a minimum illumination of 1 lux at a focal lens of 1.2. While the FMVSS minimum illumination per test point on the license plate is set at 0.75 ft-c, most surveillance video cameras installed by the Federal and State Government, Law enforcement, Department of Homeland Security agency and private citizens are not readily capable of viewing the license plate numbers at night or low light, more particularly, when the vehicle lights are turned off. This plight makes most of surveillance and security cameras useless at night to capture the visibility of license plate numbers. Some state regulations allow only 50 millicandelas of light to be emitted to the rear of the vehicle to avoid blinding the human eye following the vehicle, which makes it more difficult to attain visibility of license plate on cameras.

DESCRIPTION OF RELATED ART

Lighted license-plates are well known in the art. See for example, U.S. Pat. No. 4,857,890 which relates to a license plate frame which includes a lens that extends around the frame and a plurality of mini-lamps. The license-plate frame lights are lighted whenever the vehicle's running lights are on, and lights brighter whenever the brake lights are put on.

U.S. Pat. No. 6,095,663 relates generally to light assemblies, more particularly to light assemblies for tractor-trailers, and to a light-emitting diode (LED) combination clearance and marker light assembly. The LEDs are mounted on a single circuit board in a single plane and uses reflectors rather than optics to direct the light where needed to meet the requirements of the SAE standard.

U.S. Pat. No. 6,069,440 relates to an LED display, back light source, traffic signal, trailway signal, illuminating switch, indicator, etc. More particularly, it relates to LED comprising a phosphor, which converts the wavelength of light emitted by a light emitting component and emits light, and a display device using the LED.

U.S. Pat. No. 5,934,798 relates to a lamp assembly for illumination of a vehicle license plate which includes a substrate, a plurality of LEDs mounted on the substrate, and a lens for directing the white light emitted from the LEDs onto the license plate.

Other devices are disclosed in U.S. Pat. No. 959,431 (Lamp) to Holt; U.S. Pat. No. 1,151,401 (Double reflecting lamp) to Rousch; U.S. Pat. No. 1,238,763 (Direction Indicator) to Harris; U.S. Pat. No. 1,408,726 (Signal Light and License Plate Holder) to Fagan; U.S. Pat. No. 1,481,101 (Auto signaling device) to Kowalak; U.S. Pat. No. 1,664,025 (License Plate Holder) to Etheridge; U.S. Pat. No. 4,733,335 (Vehicular lamp) to Serizawa; U.S. Pat. No. 4,868,723 (Car number plate lamp) to Kobayashi; U.S. Pat. No. 4,929,866 (Light emitting diode lamp) to Murata; U.S. Pat. No. 5,062,027 (Automobile signal lamp) to Machida; U.S. Pat. No. 5,067,057 (Multiple parabola license plate lamp) to Stapel; U.S. Pat. No. 5,093,768 (Signal lamp composed of light emitting diodes for vehicle) to Ohe; U.S. Pat. No. 5,408,772 (Sound plate) to Pettyjohn; U.S. Pat. No. 5,528,474 (Led array vehicle lamp) to Roney; U.S. Pat. No. 5,700,080 (Vehicular lamp) to Okuda; U.S. Pat. No. 5,803,570 (Calibration system and method for display optical systems) to Chen; U.S. Pat. No. 5,934,798 (Light emitting diode license lamp) to Roller; U.S. Pat. No. 6,069,440 (Light emitting device having a nitride compound semiconductor and a phosphor containing a garnet fluorescent material) to Shimizu; U.S. Pat. No. 6,095,663 (Combination clearance and marker light assembly) to Pond; U.S. Pat. No. 6,163,038 (White light-emitting diode) to Chen.

The prior art provided longitudinally lighted devices which use the effect and construction known as edge lighting. In this construction, a transparent sheet of rigid material such as glass or plastic is illuminated by means of lamps or the like at points around the periphery of the transparent sheet. The light from the light source is transmitted longitudinally, i.e., planar to the major surfaces of the sheet. The lighted displays in the prior art are not efficient in utilizing the light longitudinally transmitted through the sheet and as such inefficiency results in a display of non-uniform reflection, low contrast, and derivatively poor visibility.

Various illumination systems for vehicle usage are known. Vehicles include a number of different components and assemblies that have an illuminator or a signal lamp associated therewith. For example, the use of electroluminescent semiconductor devices, such as solid-state light emitting diodes (LEDs), as illuminators offers many potential advantages as compared to other conventional low voltage light sources. Other light sources suffer from deficiencies, including relative inefficiency, such as is the case with conventional tungsten incandescent lamps; high operating voltages, such as is the case with fluorescent and gas discharge lamps; or susceptibility to damage, such as is the case with incandescent lamps. Another way to illuminate license plate that has been implemented in toll highways and roads were by adding high intensity spot lights to shine the rear of vehicles when crossing the toll booths, or a use of a sudden flash lights commonly seen on street intersections, school zones, or stop lights. These prior solutions to read and capture license plate numbers are only effective in short range to the point of maximum reach of spot light or flash bulbs' illumination intensity. Once the vehicle is out of reach by the illumination of spot light or flash bulb, it is impossible to capture the license plate number at night. There exists a huge problem of capturing license plate numbers as a major issue for all law enforcement and citizens to identify cars by their license plate numbers. The present invention provides a more universal and economical solution to the problem by eliminating the need for high beam, flash bulbs and limited illumination reach. The license plate illuminator of the present invention is attached to vehicles near or around the license plate to insure continuous and unlimited illumination for security and surveillance camera.

Usually, alternative light sources are not optimal for vehicular applications where only limited power or low voltage is available, or where high voltage is unacceptable for safety reasons, or in applications where there is significant shock or vibration. On the other hand, infrared emitting devices (IREDs) provide optimum illumination and are highly shock resistant. Therefore, IREDs provide significant advantages over incandescent and fluorescent bulbs, which can shatter when subjected to mechanical or thermal shock. IREDs also possess operating lifetimes from 200,000 hours to 1,000,000 hours, as compared to the typical 1,000 to 2,000 hours for incandescent lamps or 5,000 to 10,000 hours for fluorescent lamps.

SUMMARY OF THE INVENTION

The present invention relates to an apparatus for illuminating a license plate comprising infrared light emitting source and components thereof, as well as a method of using an apparatus for illuminating a license plate, comprising an infrared light emitting source. The apparatus can include one or more infrared emitting sources configured to be variably adjusted for illuminating license plates employing one or more infrared emitting device.

The present invention provides wavelength which insures detection of the signal by cameras. In order to meet regulatory requirements, the license plate also needs to be illuminated with lights arranged on the motor vehicles. Thus, typically, lights are arranged on the license plate so as to illuminate the front face of the license plate.

Due to limitations in human vision in low light level environments, white light illuminator systems have been used to produce artificial illumination and enhance visibility during nighttime, overcast conditions, or within interior quarters obscured from the reach of solar illumination. Illuminators are therefore generally designed to mimic or reproduce daytime lighting conditions, to the extent possible, so that illuminated subjects of interest are bright enough to be seen and have sufficient visual qualities such as color and contrast to be readily identifiable.

The present invention relates generally to an apparatus for illuminating license plates using one or more infrared emitting sources comprising infrared emitting devices and a method of using infrared emitting sources comprising infrared emitting devices.

One aspect of the present invention relates to an apparatus with infrared emitting sources for illuminating a license plate of a vehicle.

Another aspect of the present invention relates to an apparatus comprising a housing and a plurality of infrared emitting devices positioned within the housing. The infrared emitting devices project infrared beam with wavelength responsive to a camera to substantially illuminate the license plate without blinding the human eye.

Another aspect of the present invention relates to an apparatus or illumination system for illuminating a license plate of a vehicle. The apparatus further comprises infrared emitting devices and a rechargeable power cell. The apparatus further comprises a housing for enclosing the infrared emitting devices, power cell, sensors and electronic components all independently or integrally. The power cell provides power to the apparatus when the sensor detects that the vehicle ignition is off. The electronic components provide supporting circuitry to properly charge the power cell and switching between vehicle power source and power cell. The apparatus provides continuous illumination of the license plate when the vehicle ignition is off.

Another aspect of the present invention relates to an apparatus for illuminating a license plate of a vehicle. The apparatus comprises a plurality of infrared emitting devices mounted on a substrate or core material such as a circuit board. The apparatus further comprises a plurality of reflector segments, each reflector segment corresponding to one of the plurality of infrared light emitting device. The apparatus further comprises a housing substantially enclosing the plurality of infrared emitting devices. Each infrared emitting device projects infrared with wavelength sensitively responsive to a camera.

A further aspect of the present invention relates to an apparatus or illumination system further comprising a plurality of infrared emitting devices combined with conventional light emitting devices mounted to a substrate. The apparatus further comprises a housing substantially enclosing a plurality of infrared emitting devices in combination with conventional lights.

Still another aspect of the present invention is to provide a unique apparatus for illuminating a license plate with an infrared light emitting device which is highly sensitive to security cameras, photo-radar-camera, surveillance camera or any camera during day or night.

Another aspect of the invention is to provide an apparatus for illuminating a license plate which comprises a brilliant and sharp display in the daytime, as well as nighttime.

Another aspect of the invention is to provide an apparatus for illuminating a license plate which comprises large and small surface area luminaries, and displays of relatively even intensities with the use of a minimum number of light sources.

Another aspect of the invention is to provide an apparatus for illuminating a license plate which comprises a display with an exceptionally large field of view thus providing sharp focus from an unlimited viewing angle and minimizing parallax and depth distortion problems.

Another aspect of the invention relates to an apparatus for illuminating a license plate comprising a plurality of infrared light emitting devices connected in series, parallel or combination thereof mounted on a core material or substrate in a frame. The apparatus emits infrared light in a wavelength responsive to cameras, security camera, road camera, video-photo-radar traffic camera and others. The infrared emitting device is positioned within the perimeter of the license plate. The apparatus is powered by the vehicle power system or a rechargeable power supply.

Another aspect of the invention relates to integration of the apparatus in combination with conventional lights if the apparatus is used to replace any current license plate illuminator.

Another aspect of the invention relates to an apparatus for illuminating a license plate with or without the use of a power cell.

Another aspect of the invention to provide an apparatus for illuminating a license plate which is uniformly lighted and more particularly to improved longitudinally lighted display and viewing, where the outlines of which to be viewed are sharply and clearly defined.

Another aspect of the invention relates to a method of using illumination provided by license plate illuminator.

Related aspects, objects and advantages of the present invention will be apparent from the following description.

BRIEF DESCRIPTION OF THE DRAWINGS

FIG. 5a-d illustrate another aspect of the present invention with FIGS. 6a and 6B illustrating a cross sectional view along 55-55 of FIG. 5A using legged and surface mounted IREDs.

FIG. 6a is a cross sectional view along the lines 55-55 of FIG. 5

FIG. 6b is a cross sectional view along the lines 55-55 of FIG. 5

FIG. 0.7 shows the electrical block diagram of one embodiment of the invention.

FIG. 12 shows the present invention installed on a license plate.

FIG. 17b shows light intensity of test vehicle with vehicle lights on and lights on.

DETAILED DESCRIPTION OF THE INVENTION

Figure 1:
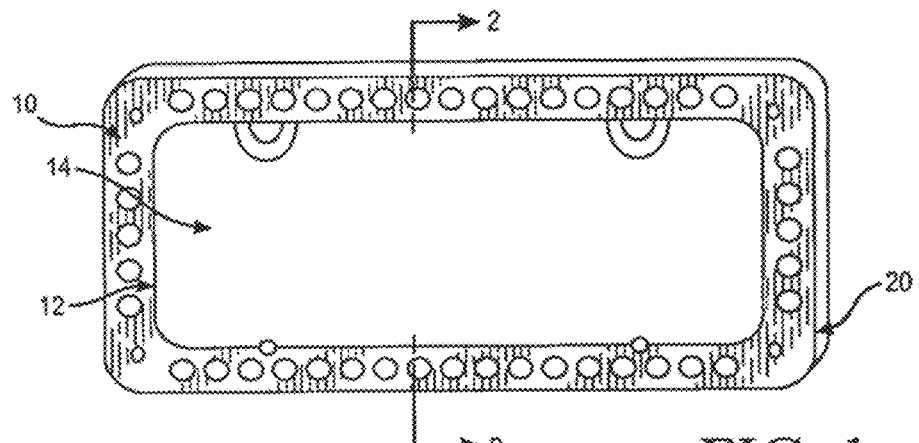
FIG. 1 is a view of one aspect of the apparatus of the present invention mounted as frame of the license plate of a vehicle.

Certain exemplary but non-limiting embodiments of the present invention are now described for illustrative purposes only, with reference to the attached drawings.

As used herein, "substantially" means essentially; or without material qualification; in the main; materially; in a substantial manner; about, actually, competently and essentially; of real worth and importance; of considerable value; where a reasonable mind would accept as adequate to support a conclusion; or considerable in importance, value, degree, amount, extent, sufficiency or significance. For example, where the infrared emitting source projects infrared beam in a direction substantially within the license plate of the vehicle refers to infrared emitting source encompassing the perimeter of the license plate.

As used herein, the lux (lx) is the international standard unit of illuminance and luminous emittance measuring luminous power per area. It is used in photometry as a measure of the intensity, as perceived by the human eye, of light that hits or passes through a surface. It is analogous to the radiometric unit watts per square meter, but with the power at each wavelength weighted according to the luminosity function, a standardized model of human visual brightness perception. One lux is equal to one lumen per square meter or 1000 millicandelas from a meter distance.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the invention relates to an apparatus for illuminating a license plate of a vehicle comprising:
a housing;
a back enclosure;
a core material having a first and second sides that are opposite to each other and one or more side faces defining the thickness of the core material; said core material interposed between the housing and back enclosure;
an infrared emitting source; said infrared emitting source arranged or positioned along one or more sides of the core material; or optionally mounted longitudinally, surrounding said core material; and
at least one or more electronic circuits connected to the core material.

Another embodiment of the invention relates to an apparatus for illuminating a license plate of a vehicle wherein the core material is a circuit board.

Another embodiment of the invention relates to an apparatus for illuminating a license plate of a vehicle wherein the infrared emitting source comprises at least one or more, or optionally a plurality of infrared emitting devices which generate infrared wavelength responsive to cameras.

Another embodiment of the invention relates to an apparatus for illuminating a license plate of a vehicle wherein infrared emitting device generates an infrared wavelength of about 450 nm to about 990 nm.

Another embodiment of the invention relates to an apparatus for illuminating a license plate of a vehicle further comprising an attachment member for securing the housing to the vehicle within the license plate perimeter.

Another embodiment of the invention relates to an apparatus for illuminating a license plate of a vehicle with an electrical circuit attached to the infrared light emitting device.

Another embodiment of the invention relates to an apparatus for illuminating a license plate of a vehicle further comprising a material to seal the circuit board, electronic component and the infrared light emitting device.

Another embodiment of the invention relates to an apparatus for illuminating a license plate of a vehicle wherein the infrared light emitting source is mounted on a circuit board, the circuit board being attached to an interior surface of the enclosure.

Another embodiment of the invention relates to an apparatus for illuminating a license plate of a vehicle wherein the infrared light emitting source is one of a plurality of infrared light emitting sources.

Another embodiment of the invention relates to an apparatus for illuminating a license plate of a vehicle wherein the infrared emitting source projects infrared beam in a direction substantially within the license plate of the vehicle.

Another embodiment of the invention relates to an apparatus for illuminating a license plate of a vehicle, comprising:
an infrared emitting source;
a housing;
a circuit board;
at least one or more electronic circuits;
a frame for mounting the license plate;
wirings; and
power supply;
wherein the power supply is selected from a rechargeable power cell, charger circuit or electronic sensor;
wherein the apparatus provides illumination of the license plate of a vehicle when the vehicle ignition is off; and
wherein the infrared emitting source projects infrared beam in a direction substantially within the license plate of the vehicle.

Another embodiment of the present invention relates to an apparatus for illuminating a license plate of a vehicle further comprising a transparent cover for the window of the housing.

Another embodiment of the present invention relates to an apparatus for illuminating a license plate of a vehicle wherein the infrared emitting source is one of a plurality of infrared emitting sources.

Another embodiment of the present invention relates to an apparatus for illuminating a license plate of a vehicle, comprising:
a plurality of infrared emitting source mounted to a circuit board;
a plurality of infrared emitting source segments, each segment corresponding to one of a plurality of infrared emitting source;
a housing substantially enclosing the plurality of infrared emitting source;
wherein each plurality of infrared emitting source beams infrared through a window of the housing attached near the vehicle license plate, the window comprising of transparent material segments being configured to substantially and uniformly illuminate the license plate.

Another embodiment of the invention relates to a method of illuminating license plate of a vehicle, comprising:
providing a housing and a back enclosure; said housing having side walls to form a hollow space for mounting the license plate;
providing a core material having a first and second sides that are opposite to each other and one or more side faces defining the thickness of the circuit board; interposing said core material between the housing and back enclosure;
providing infrared illumination by arranging or positioning infrared emitting source along one or more sides of the core material; or optionally mounting said infrared emitting source longitudinally, surrounding said core material; and
attaching at least one or more electronic circuits to the core material.

Another embodiment of the invention relates to a method of illuminating license plate of a vehicle wherein the core material is a circuit board.

Another embodiment of the invention relates to a method of illuminating license plate of a vehicle wherein the infrared emitting source comprises infrared emitting devices.

Another embodiment of the invention relates to a method of illuminating license plate of a vehicle wherein infrared emitting device generates an infrared wavelength of about 450 nm to about 990 nm.

Another embodiment of the invention relates to a method of using illumination provided by a license plate illuminator, said illuminator comprising a housing; a license plate mounted on the housing; a back enclosure; a core material having a first and second sides that are opposite to each other and one or more side faces defining the thickness of the core material; said material interposed between the housing and back enclosure;
an infrared emitting source; said infrared emitting source comprising at least one or more, or optionally a plurality of infrared emitting device (IRED) which generates infrared wavelength which are non luminaire to the human eye but luminous and sensitively responsive to surveillance cameras; said source arranged or positioned along one or more sides of the core material; or optionally mounted longitudinally, surrounding said core material;

at least one or more electronic circuits or boards on the core material; wherein the infrared emitting source is one of a plurality of infrared emitting sources comprising at least one or more, or optionally a plurality of infrared emitting device (IRED), said IRED selected from the group consisting of surface mounted IREDs or legged IREDs;

said infrared emitting device generates an infrared wavelength of about 450 nm to about 990 nm; said method comprising the steps of:

a) monitoring said license plate having mounted infrared emitting source as a means of illumination; wherein the infrared emitting source is one of a plurality of infrared emitting sources comprising at least one or more, or optionally a plurality of infrared emitting devices (IREDs), said IREDs selected from the group consisting of surface mounted IREDs or legged IREDs;

said infrared wavelength of about 450 nm to about 990 nm are non luminaire to the human eye but luminous and sensitively responsive to surveillance cameras; said infrared emitting source projects infrared beam in a direction substantially within the license plate of the vehicle; and b) reading the license plate without flaring bright light at the license plate, when the vehicle engine is on park mode, waiting mode and running mode.

Another embodiment of the invention relates to a method of using illumination provided by a license plate illuminator, further comprising reading the license plate by a surveillance or security camera when the vehicle engine is on park mode.

Another embodiment of the invention relates to a method of using illumination provided by a license plate illuminator, further comprising reading the license plate by a surveillance or security camera when the vehicle engine lights and electrical power is turned off.

Another embodiment of the invention relates to a method of using illumination provided by a license plate illuminator, further comprising reading the license plate by a surveillance or security camera wherein the shutter speed of the camera was at a speed selected from $1/30$, $1/60$, $1/120$, or $1/240$ with no vehicle power supply applied, and the license plate was readable by the surveillance or security camera.

Another embodiment of the invention relates to a method of using illumination provided by a license plate illuminator, further comprising reading the license plate by a surveillance or security camera when the area is near total darkness and street lights are present or when license plate illuminance is below 5 lux, the vehicle is parked and vehicle lights are off, and the license plate was readable by the surveillance or security camera.

Another embodiment of the invention relates to a method of using illumination provided by a license plate illuminator, further comprising reading the license plate by a surveillance or security camera when the area is near total darkness and street lights are more than 200 feet away from the vehicle, the vehicle is parked and vehicle lights are off, the license plate was readable by the surveillance or security camera.

Another embodiment of the invention relates to a method of using illumination provided by a license plate illuminator, further comprising reading the license plate by a surveillance or security camera when the vehicle engine is on waiting mode.

Another embodiment of the invention relates to a method of using illumination provided by a license plate illuminator, further comprising reading the license plate by a surveillance or security camera wherein the shutter speed of the camera was at a speed selected from $1/30$, $1/60$, $1/120$, or $1/240$ with vehicle engine on and vehicle lights are off, and the license plate was readable by the surveillance or security camera.

Another embodiment of the invention relates to a method of using illumination provided by a license plate illuminator, further comprising reading the license plate by a surveillance or security camera when the area is near total darkness and street lights are present or when license plate illuminance is below 5 lux, the vehicle is parked with vehicle engine on and vehicle lights are off, and the license plate was readable by the surveillance or security camera.

Another embodiment of the invention relates to a method of using illumination provided by a license plate illuminator, further comprising reading the license plate by a surveillance or security camera when the area is near total darkness and street lights are more than 200 feet away from the vehicle, the vehicle is parked with vehicle engine on and vehicle lights are off, and the license plate was readable by the surveillance or security camera.

Another embodiment of the invention relates to a method of using illumination provided by a license plate illuminator, further comprising reading the license plate by a surveillance or security camera when the vehicle engine is on running mode.

Another embodiment of the invention relates to a method of using illumination provided by a license plate illuminator, further comprising reading the license plate by a surveillance or security camera wherein the shutter speed of the camera was at a speed selected from $1/30$, $1/60$, $1/120$ or $1/240$, with vehicle engine on and vehicle lights are on, and the license plate was readable by the surveillance or security camera.

Another embodiment of the invention relates to a method of using illumination provided by a license plate illuminator, further comprising reading the license plate by a surveillance or security camera when the area is near total darkness and street lights are present or when license plate illuminance is below 5 lux, the vehicle is parked with vehicle engine on and lights are on, and the license plate was readable by the surveillance or security camera.

Another embodiment of the invention relates to a method of using illumination provided by a license plate illuminator, further comprising reading the license plate by a surveillance or security camera when the area is near total darkness and street lights are more than 200 feet away from the vehicle, the vehicle is parked with vehicle engine on and lights are on, the license plate was readable by the surveillance or security camera.

Another embodiment of the invention relates to a method of using illumination provided by a license plate illuminator, further comprising reading the license plate wherein the license plate illuminator comprises a daylight sensor similar to Light Dependant Resistor (LDR), also known as photocell, together with the loss of main power source which triggers the relay to switch the power to power cell and when daylight sensor senses that it is day light, will not trigger the switch-over.

Another embodiment of the invention relates to a method of using illumination provided by a license plate illuminator, further comprising reading a license plate wherein the license plate illuminator provides a sensor which senses the presence of vehicle power, such that when the vehicle power is lost, a switch-over circuitry will connect the infrared emitting devices to the power cell if daylight sensor senses that natural light is below the minimum required.

Another embodiment of the invention relates to a method of using illumination provided by a license plate illuminator, wherein reading the license plate by a surveillance or security camera provided intense illumination when conducted on a night mode.

Another embodiment of the invention relates to a method of using illumination provided by a license plate illuminator, wherein reading the license plate by a surveillance or security camera provided improved readability and intense illumination of license plate.

Another embodiment of the invention relates to a method of using illumination provided by a license plate illuminator, wherein reading the license plate by a surveillance or security camera was conducted on a license plate illuminator comprising three pieces of circuit board and two rows of a plurality of IREDs, said circuit board comprising two circuit board on the right frame and one circuit board at the bottom of the license plate frame.

Another embodiment of the invention relates to a method of using illumination provided by a license plate illuminator, wherein reading the license plate by a surveillance or security camera was conducted on a license plate illuminator further comprising regulators such as the chargers, sensors, or supporting electronics may be positioned on the right side of the core material while the power cell is on the opposite left side of the core material and a wiring harness connects the circuit board to the power connector.

Another embodiment of the invention relates to a method of using illumination provided by a license plate illuminator, wherein reading the license plate by a surveillance or security camera was conducted on a license plate illuminator which can attain illumination higher than 1 lux without blinding the human eye of a driver or user of security or surveillance camera.

Another embodiment of the invention relates to a method of using illumination provided by a license plate illuminator, wherein reading the license plate by a surveillance or security camera was conducted on a license plate illuminator comprising IREDs positioned or arranged along at least one or more sides of the core material; at the top and bottom sides of the core material; or optionally mounted substantially longitudinally, surrounding said circuit board.

License Plate Assembly

According to the apparatus of the present invention, the license plate may be mounted on the housing. The housing comprises a front face and a back enclosure The front face may be a transparent window. The apparatus includes a housing substantially enclosing a plurality of infrared emitting device, or may be in combination with conventional light, such as incandescent lamp or light emitting devices (LEDs). A core material or substrate may be interposed between the front face and the back enclosure. The core material comprises top and bottom sides and left and right sides. The light source for illuminating the license plate comprises infrared emitting sources comprising infrared emitting devices (IREDs). The wavelength of the IREDs is at least about 450 to about 990 nm. The IREDs may be positioned or arranged along at least one or more sides of the core material; at the top and bottom sides of the core material; or optionally mounted substantially longitudinally, surrounding said circuit board. The IREDs emits light substantially along its longitudinal direction and comprises surface mounted IREDs or legged IREDs. The individual IREDs are spaced from each other and arranged adjacent to each other along the longitudinal direction of the light source. The light source can comprise a linear array of separate infrared light emitting elements. According to a particular embodiment, a plurality of infrared emitting devices (IREDs) may be used as a light source for illuminating the license plate. The regulators such as the chargers, sensors, or supporting electronics may be positioned on the right side of the core material while the power cell is on the opposite left side of the core material. The wiring harness connects the circuit board to the power connector.

A transparent window is mounted on the housing; said transparent window having a front face to which the license plate can be removably mounted and a back enclosure opposite thereto. A reflector may be used and arranged at the side faces of the IREDs. The reflectors preferably are diffuse reflective, specular reflective, or scattering reflective films with high reflection efficiency. Arranging reflectors and, in particular, highly diffuser or specular or scattering reflective films along the back and side faces of the IREDs provides for light can escape exclusively through the front face so that most of the light of the light source can be used for illuminating the license plate. Preferably, the reflectors are specular. However if the IREDs are positioned in accordance with FIG. 5 and FIG. 6, reflectors may not necessary. Accordingly, the design is highly efficient with regard to the required brightness, even illumination, and power consumption.

In accordance with a particular embodiment, the housing comprises a back plate having upstanding side walls. Between the housing and the back plate of the housing is provided a core material such as a circuit board. A frame provides support to the core material. The housing may be further protected with a transparent cover or sheet that is preferably sealed against the side walls of the housing. A property of the transparent cover is such that it is substantially transparent in configuration for infrared light to transmit through the license plate. According to a preferred embodiment, the frame and the housing are provided with reclosable fasteners such that the housing can be opened to replace the license plate if necessary. Alternatively, the frame may be screwed against the back plate. Also, in a particular embodiment, a rubber seal may be included, for example in the frame. Preferably, the back plate of the housing is continuous and closed to avoid dirt and humidity penetrating between the core material and the license plate.

Figure 2:
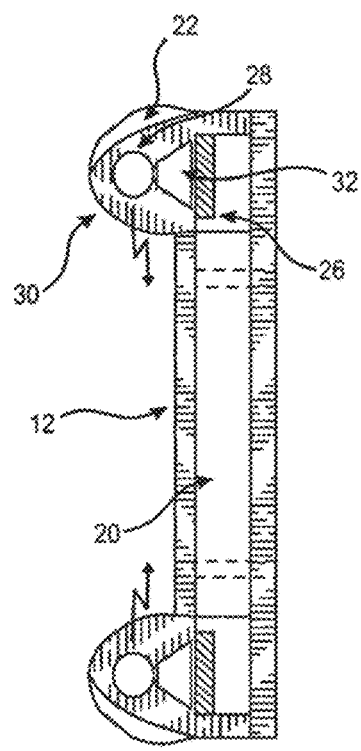
FIG. 2 is a side view along the lines 2-2 of FIG. 1.

The invention will now be described in more detail with reference to the following drawings which are schematic, purely illustrative and should not be taken to limit the invention in any way:

With reference to FIGS. 1 and 2, there is illustrated one aspect of the apparatus of the present invention. With reference to FIG. 1, the apparatus 10 for illuminating the surface 14 of license plate 12 includes a housing 20. The license plate 12 is attached to a vehicle (not illustrated) in any of a variety of ways known to one of ordinary skill in the art.

The housing 20 of apparatus 10 is affixed to the vehicle circumventing the license plate 12 in any of a variety of ways known to one of ordinary skill in the art, such as a mounting bracket, screws, adhesive or combinations thereof. For example, the housing 20 may comprise an attachment member that attaches the apparatus 10 directly to the vehicle or to a bracket mounted to the vehicle. The housing 20 is preferably centered about the lengthwise center of the license plate 12.

FIG. 2 is transverse cross sectional view of the illuminated license plate. With reference to FIG. 2, further details of the interior of the housing 20 of apparatus 10 are illustrated. The housing 20 encloses the functional parts of the apparatus 10 to protect the functional parts from the environment.

The housing 20 encloses a core material or circuit board or other substrate 26 containing one or more infrared emitting devices (IREDs) 28. The substrate 26 is a circuit board or other medium designed to hold electronic components and direct electrical power from the vehicle wiring to the IREDs 28. The Infrared emitting device 28 emits infrared wavelength. The light from the IREDs 28 is substantially intercepted by the reflector or reflectors 22. The reflector 22 serves to redirect the light from IREDs 28 through a substantially transparent window 30 onto the front surface 14 of license plate 12 in a substantially uniform fashion.

The substantially transparent window 30 of housing 20 serves to protect the interior components of apparatus 10 from the dust and dirt of the exterior environment. Additionally, a potting or molding material 32 is used to seal the light emitting diodes 28 and the substrate 26, thus protecting the substrate 26 and IREDs 28 from moisture and preventing corrosion. The potting or molding material can be selected from adhesive, that is commercially and readily available in the market.

Figure 3:
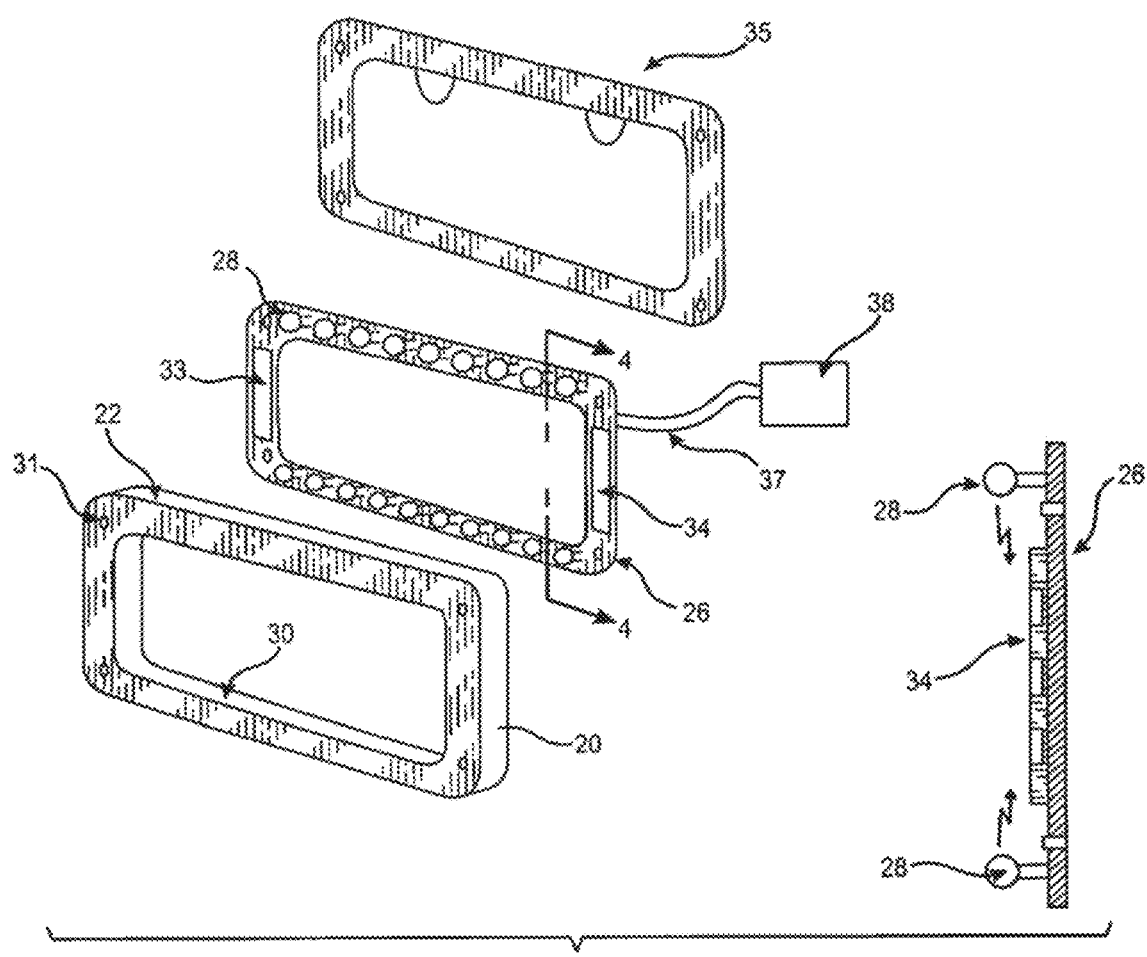
FIG. 3 is a perspective view of one aspect of the apparatus of the present invention.

An embodiment of the invention is further illustrated in FIG. 3. According to FIG. 3, the apparatus for illuminating license plate 12 comprises a housing 20, core material 26 and back enclosure 35. FIG. 3 is the frontal, elevational view of an illuminated license plate. The Figure illustrates the housing 20, transparent window 30, attachment member 31 secures the housing to back enclosure 35, core material or circuit board 26, position of the IREDs 28 which comprises legged IREDS or surface mounted IREDs, power connector 38, power cell 33, regulators, chargers, sensors supporting electronics 34, and wiring harness 37. FIG. 3 illustrates the wire harness 37 is connected to the power connector 38. The regulators, charger sensor supporting electronics 34 is on one side of the circuit board and on the parallel opposite side is the power cell 33. The attachment member 31 secures the housing to the back enclosure.

Figure 4A:
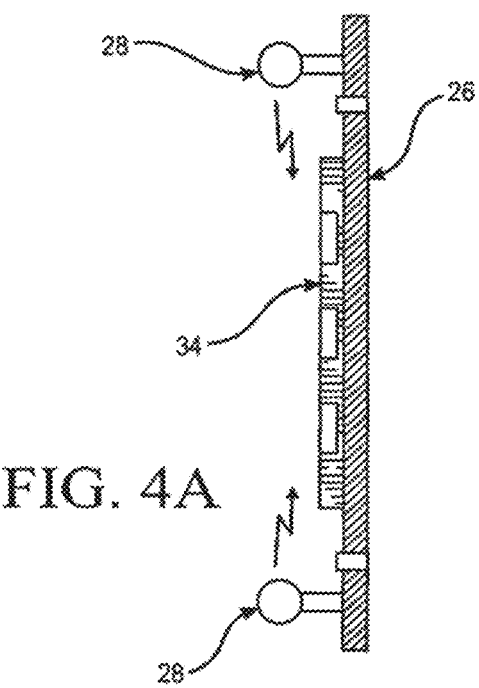
FIG. 4a is a cross sectional view of the apparatus of the present invention using legged infrared emitting device as shown in FIG. 3.
Figure 4B:
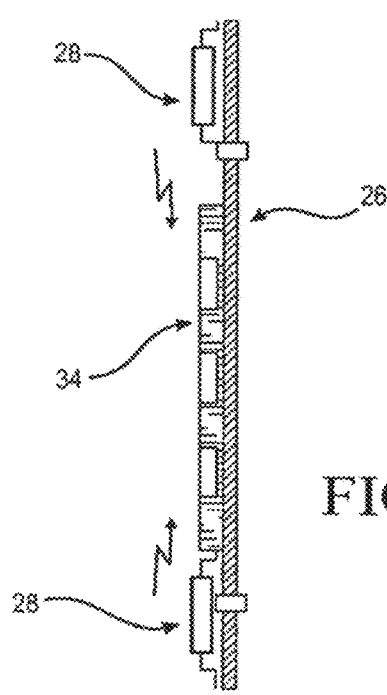
FIG. 4b is a cross sectional view of the apparatus of the present invention using surface mounted infrared emitting device as shown in FIG. 3.

FIG. 4a is the cross sectional view of FIG. 3 using legged IREDs while FIG. 4b is the cross sectional view of FIG. 3 using surface mounted IREDs.

FIGS. 5a-d illustrate another aspect of the present invention with FIG. 6a illustrating a cross sectional view along 55-55 of FIG. 5 using legged IREDs 28, and FIG. 6b illustrating cross sectional view along 55-55 of FIG. 5 using surface mounted IREDs 28. Apparatus 10 is arranged around the perimeter of license plate 12 in order to illuminate surface 14 of the license plate 12. The housing 20 contains core material or circuit board 26, IREDs 28, power cell 33 and regulators, chargers, sensors supporting electronics 34. The wiring harness 37 connects the power connector 38 to the core material. The substantially transparent window 30 of the housing 20 serves to protect the interior components of apparatus 10 from dust and dirt of the exterior environment.

Figure 7:
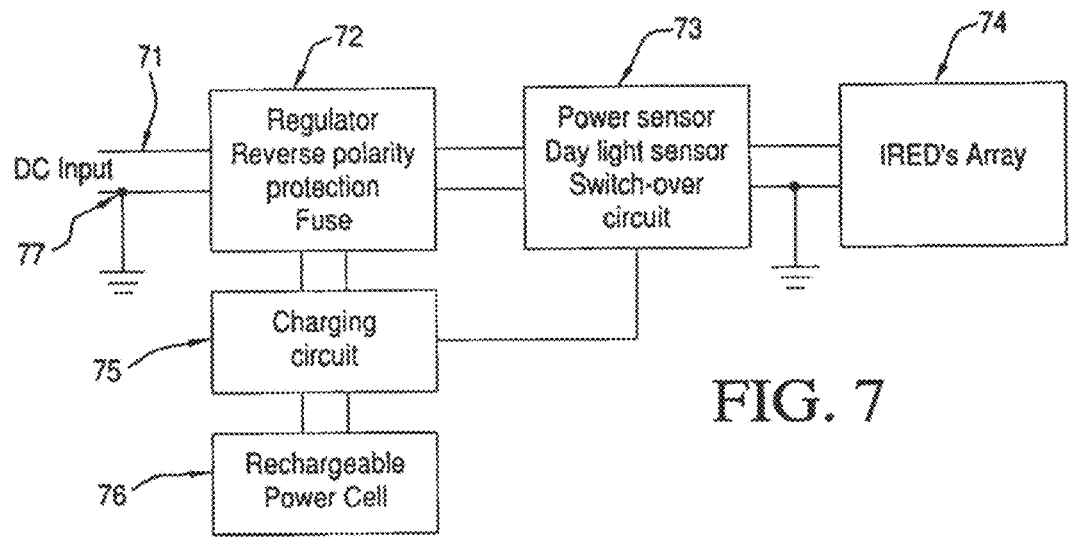
Figure 8:
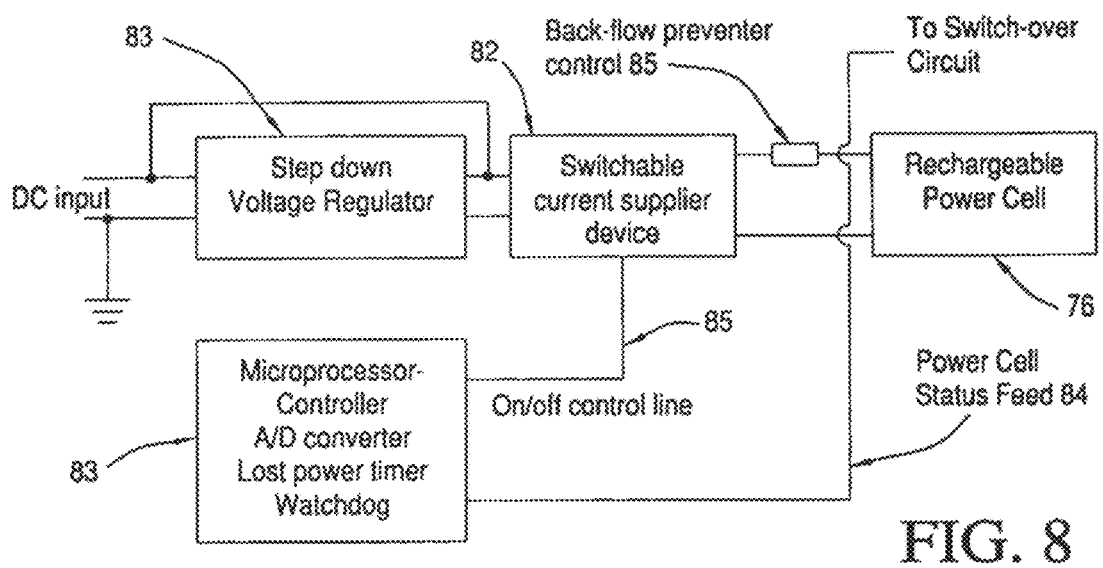
FIG. 8 shows a view of the charging circuitry block diagram.

FIG. 7 is a block diagram of the functionality of the circuitry of a preferred embodiment. Electrical current (power) to the apparatus is delivered by wire harness 37 via connector 38. Wire harness 37 is then connected or soldered to the core material or circuit board copper hot line 71 and ground line 77. A regulator, fuse and reverse polarity protection 72 is placed in between the remaining circuitry to provide additional safety. The functions of each block are as follows: a) Power sensor 73 to sense the presence of vehicle power, the apparatus will then use the vehicle power. When the vehicle power is lost, the switch-over circuitry will connect the IREDs to the power cell ONLY IF the daylight sensor senses that natural light is below the minimum required; b) Charging unit 75 is used to charge the power cell 76 and maintain it fully charged when the vehicle ignition is on, more details of the charging unit are shown in FIG. 8; and c) Power cell 76 may be a nickel metal hydride (NiMH) type or the other similar materials known to one of ordinary skill in the art. An alternative cell which may be used which is commercially available is Lithium-ion battery and is known for its best energy-to-mass ratios and a very slow loss of charge when not in use.

FIG. 8 is a diagram of the Charging Circuitry. The step down voltage regulator 81 is used to provide lower voltage necessary for the microprocessor/controller, A/D converter, timer and watch dog 83. The switchable current supplier device 82 is a device supply current to charge the power cell 76. The switchable current supplier device 82 is a solid state device, relay or the like which are commercially available. When the power cell 76 charge capacity is below a certain level, the "status feed" line 84 sends a signal to the microprocessor/controller 83 to initiate an algorithm for the microprocessor 83 to activate the switchable current supplier device 82 to "ON" passing enough current to charge the power cell 76. When the power cell 76 current reaches its storage capability, the "status feed" line 84 sends another signal to 83 to turn OFF current supplier device 82 preventing to overcharge power cell 76. A back-flow preventer 85 is used to stop any current leakage of power cell back to the charger circuitry.

Figure 9:
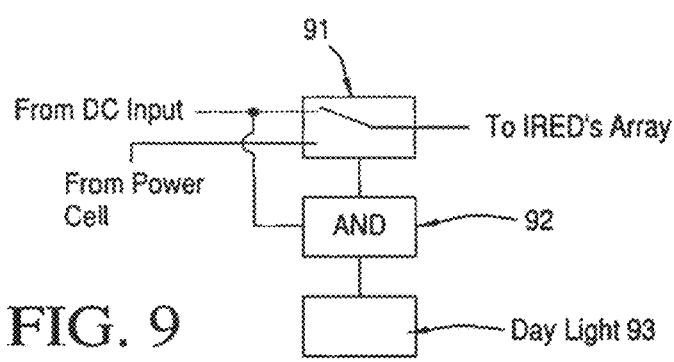
FIG. 9 shows a view of the switch over circuitry block diagram.

FIG. 9 is the switch-over circuitry. This circuitry provides the necessary switching between the main power supply from the vehicle to the power cell 76. A solid state switch or relay 91 switches between the main power source or power cell to power the IREDs 28. When the main power source is not present, as if the vehicle ignition is OFF, a solid state AND device (Boolean) 92 determines whether to switch the power source to power cell mode. A daylight sensor 93 similar to Light Dependant Resistor (LDR), also known as photocell, together with the loss of main power source will trigger the relay 91 to switch the power to power cell 76. When daylight sensor 93 senses that it's day light, it will not trigger the switch-over.

Figure 10A:
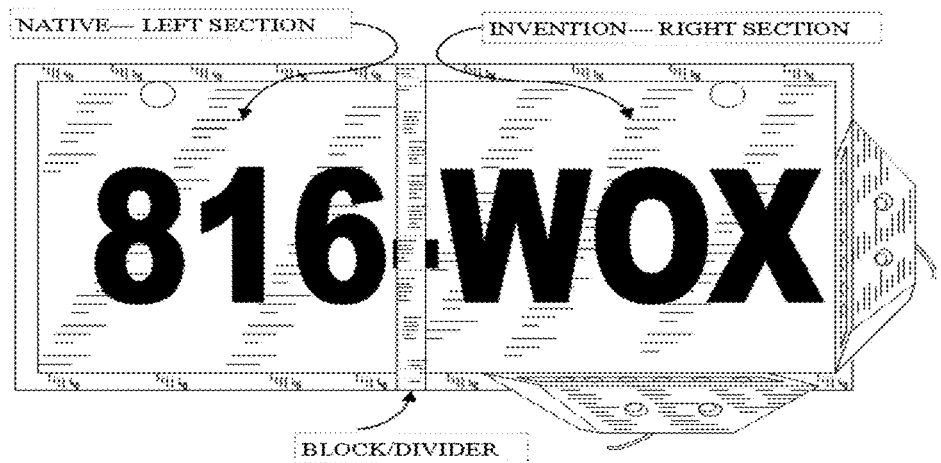
FIG. 10a shows a vehicle license plate with control and present invention for comparison.
Figure 10B:
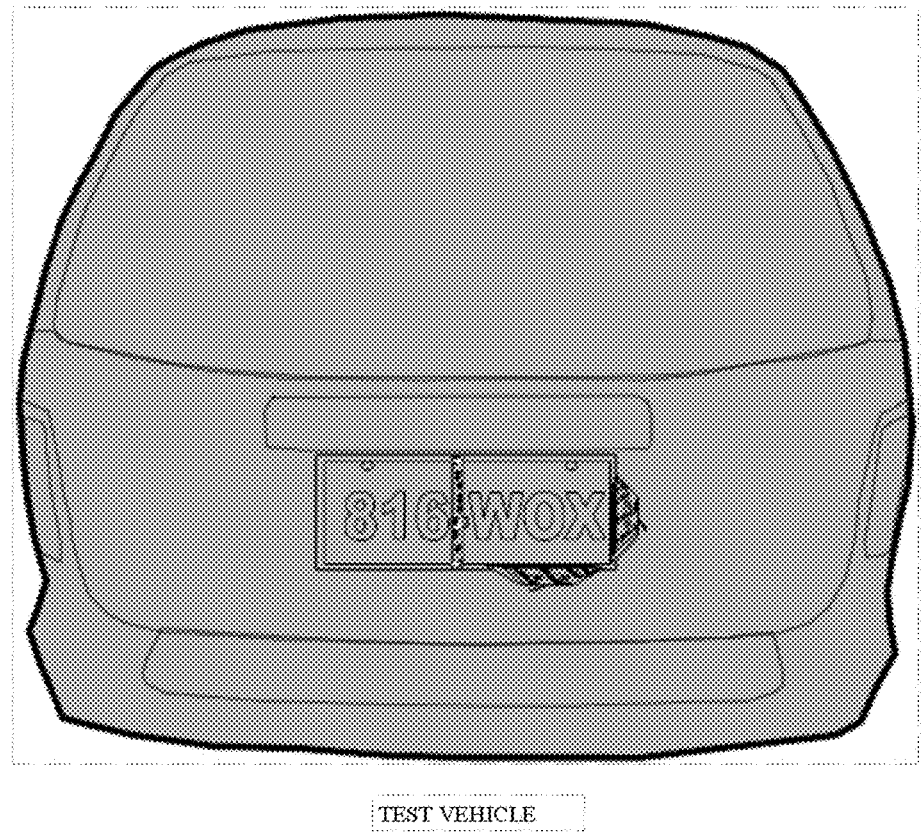
FIG. 10b shows the license plate illuminator installed on the test vehicle.

FIG. 10a shows a vehicle license plate with control and present invention for comparison. The Examples illustrate the comparison. FIG. 10b shows the license plate illuminator installed on the test vehicle that was used in the experiment.

Figure 11A:
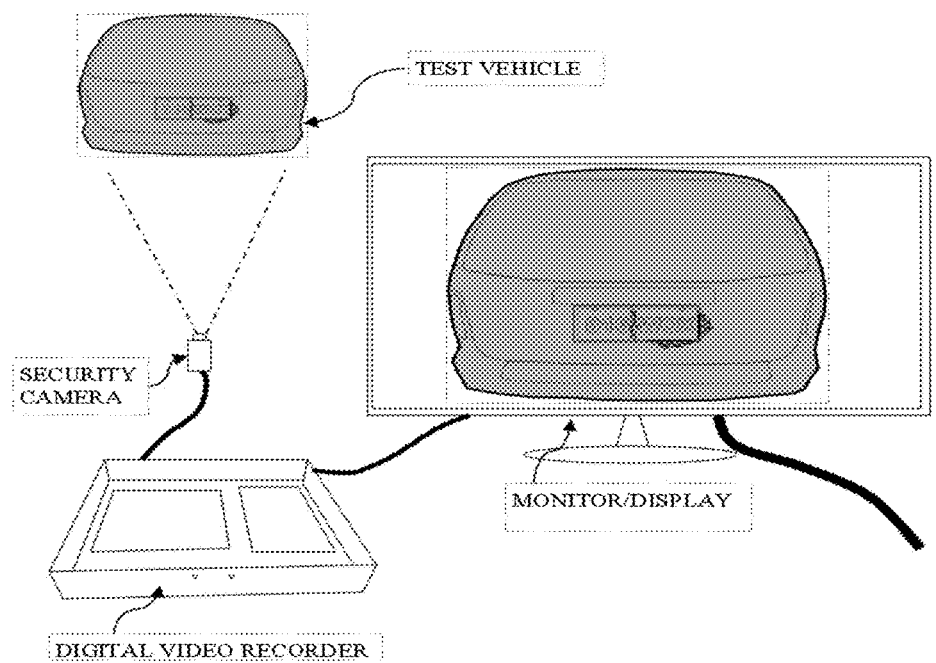
FIG. 11a shows the recorder, CCTV monitor and security camera field of view.
Figure 11B:
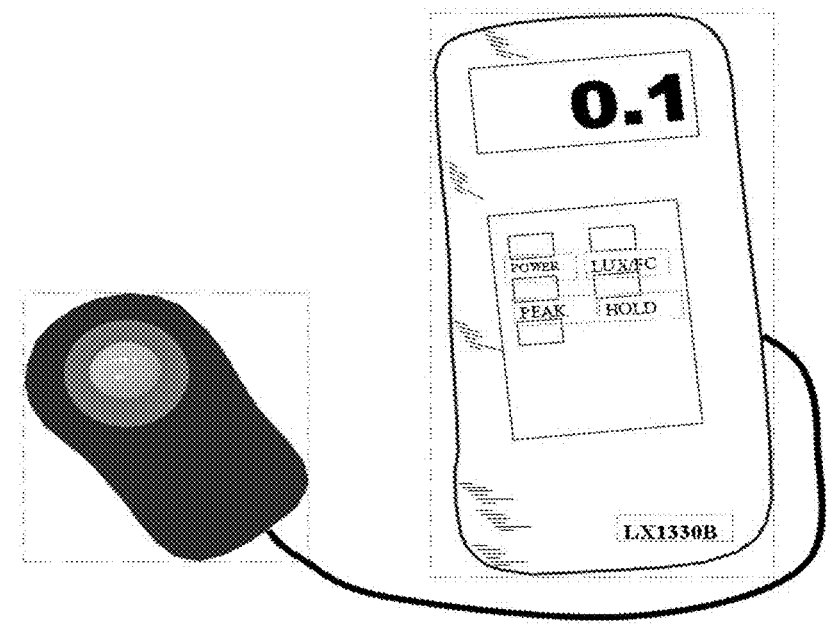
FIG. 11b shows the light intensity meter.

FIG. 11a shows the recorder, CCTV monitor and security camera field of view. FIG. 11b shows the light intensity meter.

Figure 13A:
FIG. 13a shows the captured license plate with present invention using a security camera with shutter speed of 1/30 when the vehicle engine and lights is off at night.
Figure 13B:
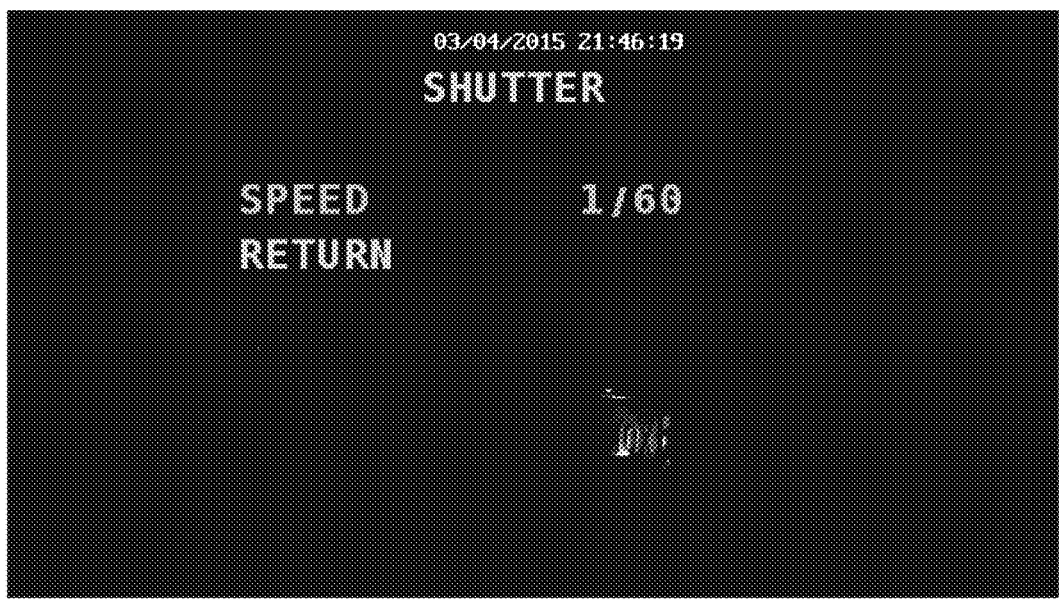
FIG. 13b shows the captured license plate with present invention using a security camera with shutter speed of 1/60 when the vehicle engine and lights is off at night.

FIG. 12 shows the present invention installed on a license plate. FIG. 13a shows the captured license plate with present invention using a security camera with shutter speed of 1/30 when the vehicle engine and lights is off at night. FIG. 13b shows the captured license plate with present invention using a security camera with shutter speed of 1/60 when the vehicle engine and lights is off at night.

Figure 14A:
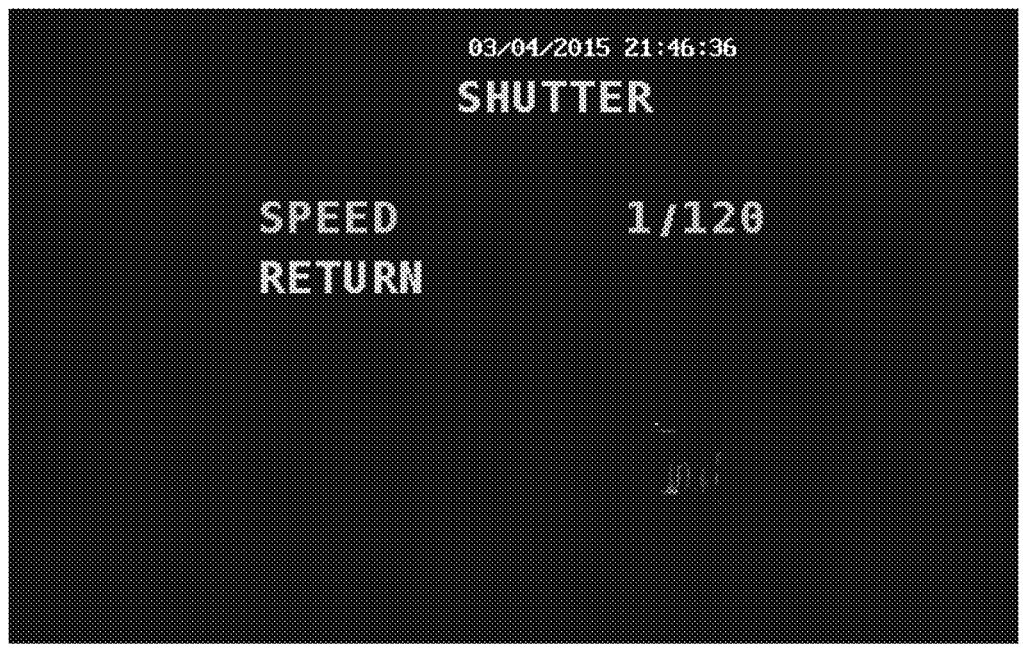
FIG. 14a shows the captured license plate with present invention using a security camera with shutter speed of 1/120 when the vehicle engine and lights is off at night.
Figure 14B:
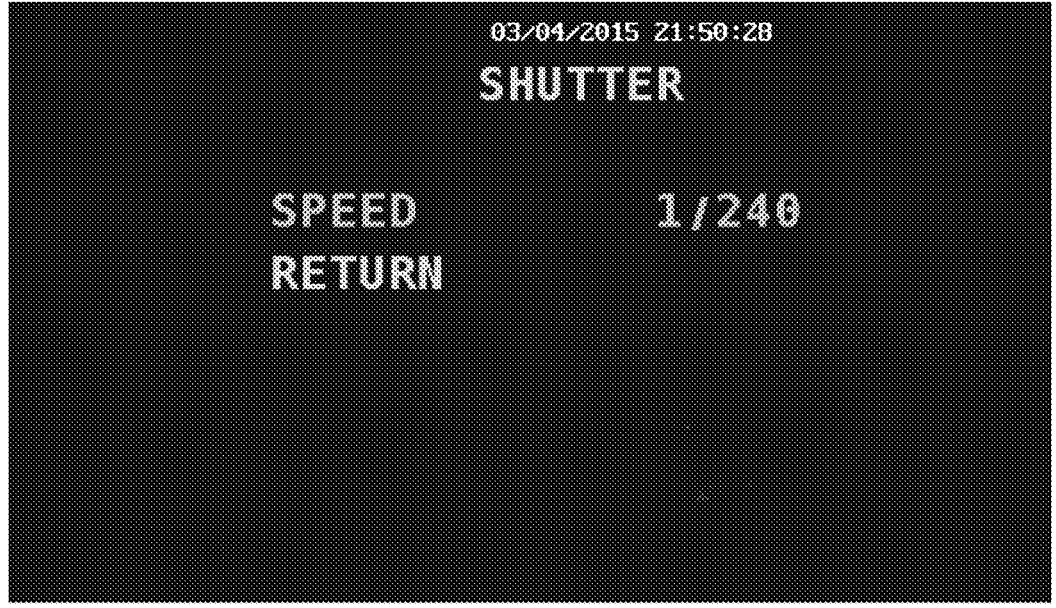
FIG. 14b shows the captured license plate with present invention using a security camera with shutter speed of 1/240 when the vehicle engine and lights is off at night.

FIG. 14a shows the captured license plate with present invention using a security camera with shutter speed of 1/120 when the vehicle engine and lights is off at night. FIG. 14b shows the captured license plate with present invention using a security camera with shutter speed of 1/240 when the vehicle engine and lights is off at night.

Figure 15A:
FIG. 15a shows light intensity and visibility of test vehicle with vehicle engine and lights off at night.
Figure 15B:
FIG. 15b shows readability of license plate with security camera shutter speed at 1/30 when the vehicle engine is on and lights are off at night.

FIG. 15a shows light intensity and visibility of test vehicle with vehicle engine and lights off at night. FIG. 15b shows readability of license plate with security camera shutter speed at 1/30 when the vehicle engine is on and lights are off at night.

Figure 16A:
FIG. 16a shows 2× zoom readability of license plate with security camera shutter speed at 1/30 when the vehicle engine is on and lights are off at night.
Figure 16B:
FIG. 16b shows readability of license plate with security camera shutter speed at 1/60 when the vehicle engine is on and lights are off at night.

FIG. 16a shows 2× zoom readability of license plate with security camera shutter speed at 1/30 when the vehicle engine is on and lights are off at night. FIG. 16b shows readability of license plate with security camera shutter speed at 1/60 when the vehicle engine is on and lights are off at night.

Figure 17A:
FIG. 17a shows readability of license plate with security camera shutter speed at 1/120 when the vehicle engine is on and lights are off at night.
Figure 17B:
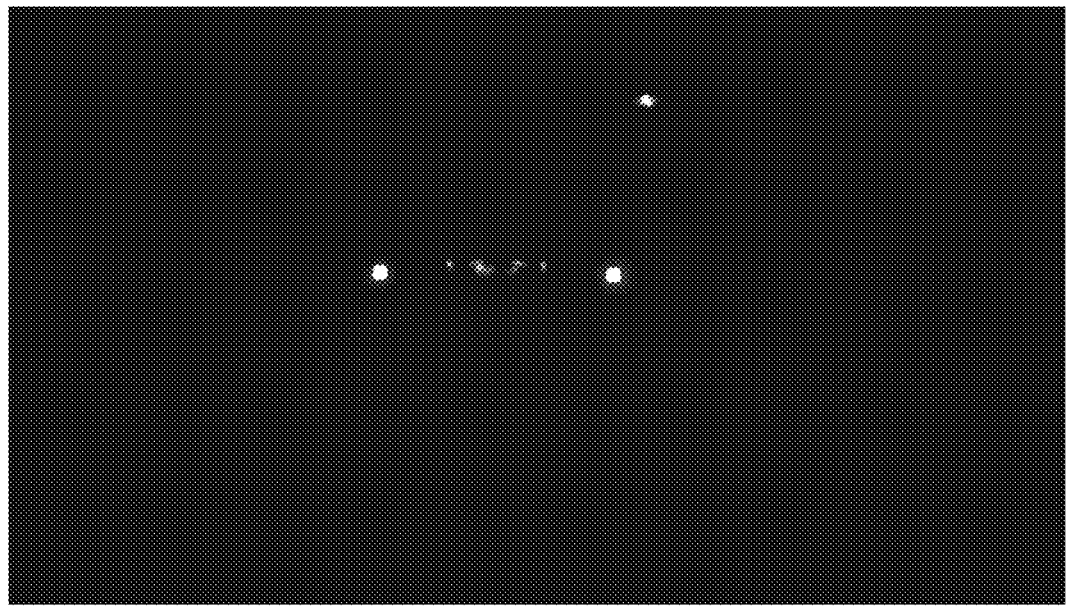

FIG. 17a shows readability of license plate with security camera shutter speed at 1/120 when the vehicle engine is on and lights are off at night. FIG. 17b shows light intensity of test vehicle with vehicle lights on and lights on.

Figure 18A:
FIG. 18a shows security camera shutter speed at 1/30 when the vehicle engine is on and lights are on at night.
Figure 18B:
FIG. 18b shows security camera shutter speed at 1/60 when the vehicle engine is on and lights are on at night.

FIG. 18a shows security camera shutter speed at 1/30 when the vehicle engine is on and lights are on at night. FIG. 18b shows security camera shutter speed at 1/60 when the vehicle engine is on and lights are on at night.

Figure 19A:
FIG. 19a shows security camera shutter speed at 1/120 when the vehicle engine is on and lights are on at night.
Figure 19B:
FIG. 19b shows view of overall testing area.

FIG. 19a shows security camera shutter speed at 1/120 when the vehicle engine is on and lights are on at night. FIG. 19b shows view of overall testing area.

Figure 20A:
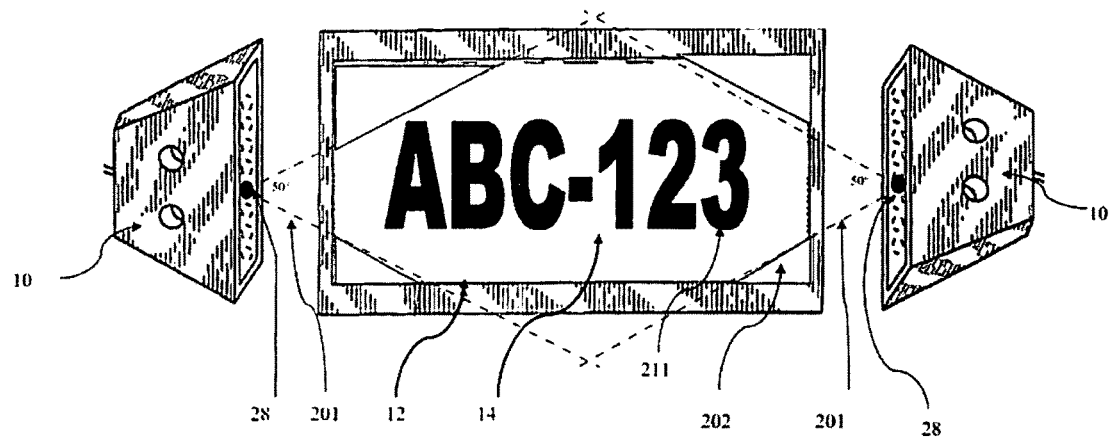
FIG. 20a shows license plate illuminator using an IRED.
Figure 23A:
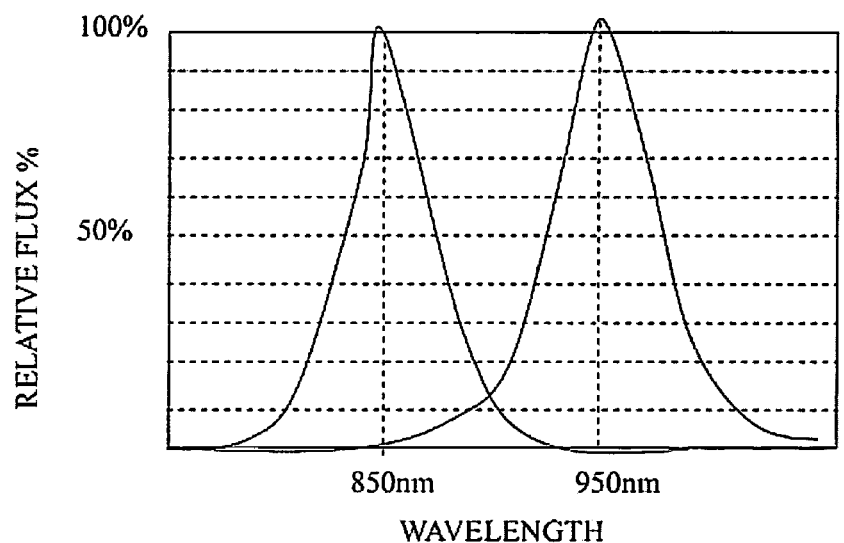
FIG. 23a shows graph plot of relative flux, % and wavelength.
Figure 23B:
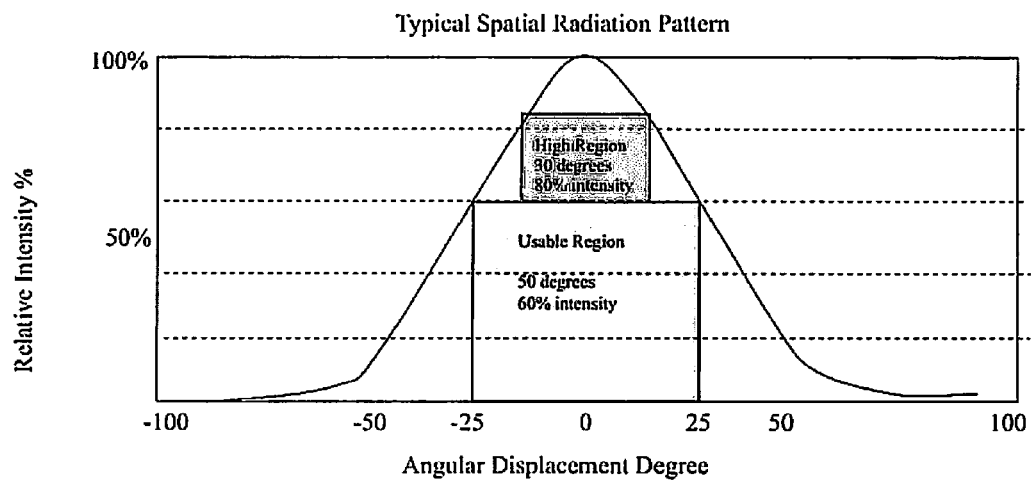
FIG. 23b shows graph plot of relative intensity, % and angular displacement degree.

FIG. 20a shows another embodiment of the present invention, apparatus 10 with license plate illuminator using IRED 28 with an optimal width of 50° angular displacement infrared beam 201 to obtain an optimal relative intensity of at least 60% of infrared as shown in spatial radiation pattern in FIG. 23b. Two of apparatus 10 can be mounted horizontally on the left and right side of the license plate 12 to illuminate the license plate surface 14. The license plate surface 14 reflects the intensity of the infrared enabling security, surveillance or any cameras to contrast the images of the surface 14 and license numbers 211, thereby effectively capturing the license number 211. The apparatus 10 is positioned along the license plate 12 perimeter such that infrared beam 201 illuminates the license plate surface 14 with a minimum infrared intensity of 60% or more. IRED 28 may allow infrared beam 201 to illuminate beyond the 50° nominal beam angle 201 with an intensity below the desired 60% as illustrated with grayed area 202.

Figure 20B:
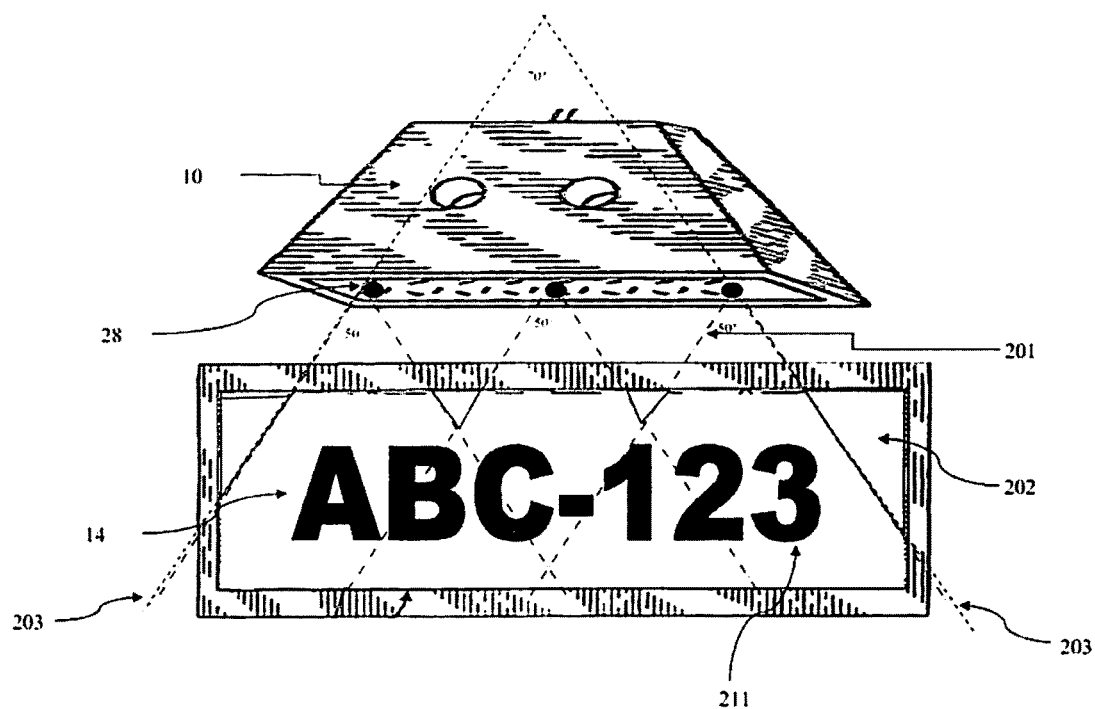
FIG. 20b shows license plate illuminator using three IREDs.

FIG. 20b illustrates another embodiment of the present invention apparatus 10 utilizing triple quantity of IRED 28 with optimal horizontal width of 50° angular displacement infrared beam 201 to obtain a total of infrared illumination area 203 of 70° and attain a relative intensity of at least 60% of infrared as shown in Spatial Radiation Pattern in FIG. 23b. Three IRED 28 is implemented in apparatus 10 which is mounted on top of license plate 12 to illuminate the license plate surface 14. The license plate surface 14 reflects the intensity of the infrared enabling security, surveillance or any cameras to contrast the images of the surface 14 and license numbers 211, thereby effectively capturing the license number 211. The apparatus 10 is positioned on top of the license plate 12 perimeter such that total infrared beam 203 illuminates the license plate surface 14 with a minimum infrared intensity of at least 60% or more. IRED 28 may allow infrared beam 201 to illuminate beyond the 50° nominal beam angle 201 with an intensity below the desired 60% as illustrated with grayed area 202.

Figure 20C:
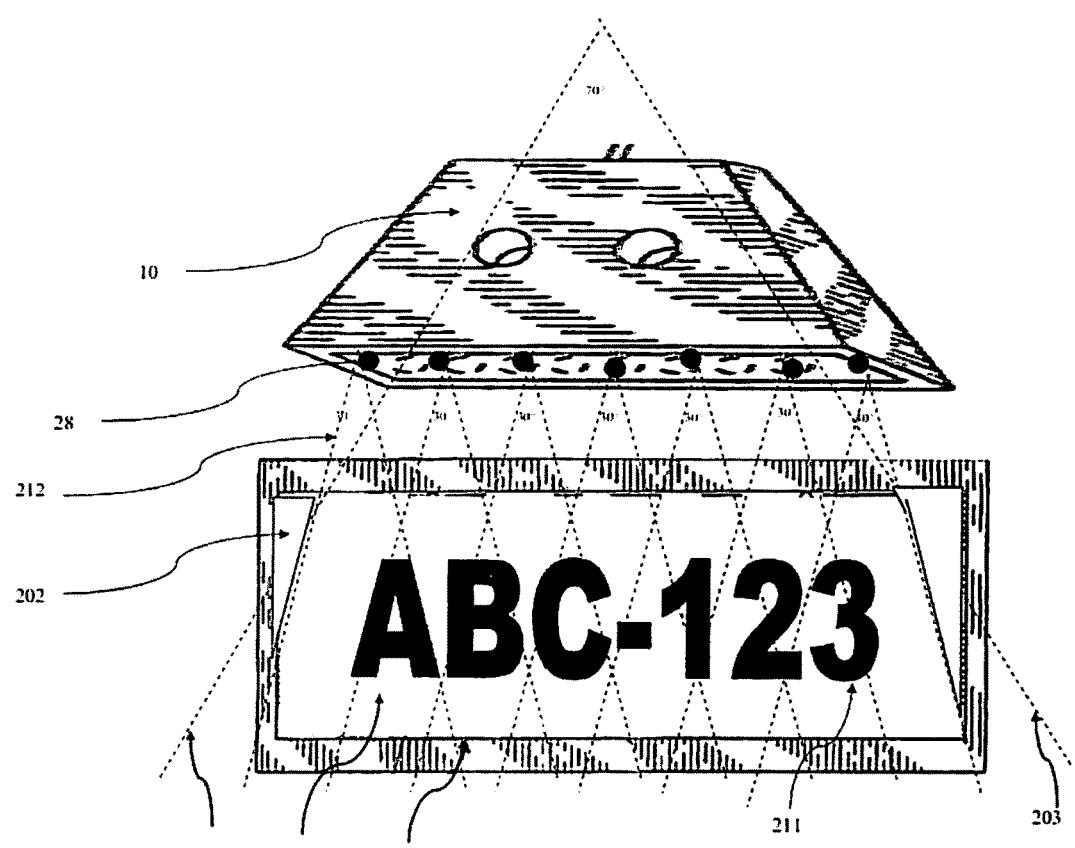
FIG. 20c shows license plate illuminator using a plurality of IREDs.

Another embodiment of the invention is further illustrated in FIG. 20c. Apparatus 10 having seven of IRED 28 with optimal horizontal width of 30° angular displacement infrared beam 212 to obtain the high region relative intensity of 80% of infrared as shown in Spatial Radiation Pattern FIG. 23b. The seven IREDs 28 are placed evenly in the apparatus 10 to obtain a total infrared illumination area of 70° and high region intensity. The license plate surface 14 reflects the intensity of the infrared enabling security, surveillance or any cameras to contrast the images of the surface 14 and license numbers 211, thereby effectively capturing the license number 211. The apparatus 10 is positioned on top of the license plate 12 perimeter such that total infrared beam 203 illuminates the license plate surface 14 with a minimum infrared intensity of 80%. IRED 28 may allow infrared beam 201 to illuminate beyond the total 70° infrared beam angle 203 with an intensity below the desired 80% as illustrated with grayed area 202.

Figure 21A:
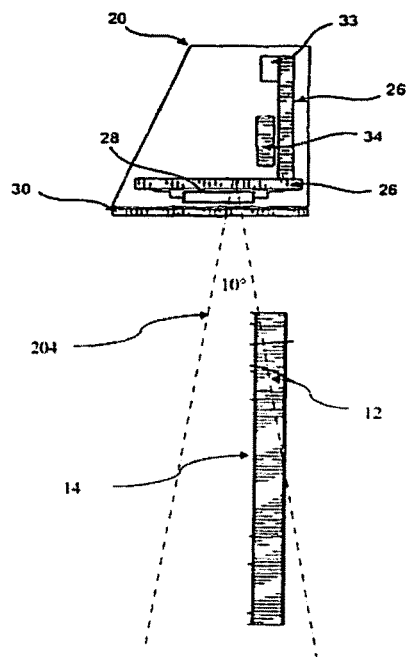
FIG. 21a shows license plate illuminator using IRED having a vertical beam height.
Figure 21B:
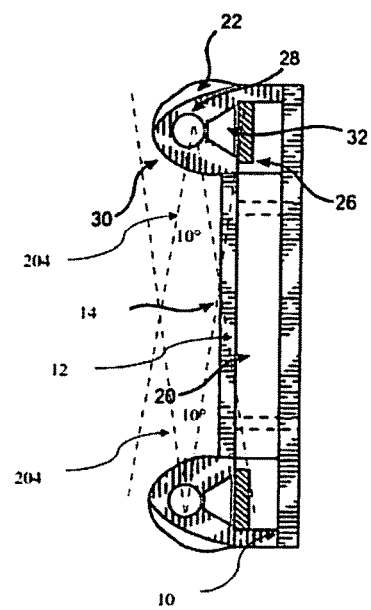
FIG. 21b shows license plate illuminator using IRED having a vertical angular displacement.

FIG. 21a and FIG. 21b are cross sectional views of apparatus 10 showing an example of IRED 28 having a vertical angular displacement infrared beam 204 of 10° to narrow the focus of the infrared illumination to the license plate surface 14. Selecting a wider vertical angular displacement of IRED will provide further wider coverage of illumination. Thus, if one wants to implement illumination of the entire back of a vehicle, a surface of shipping container, yacht, boat, ship or any moving object, one may do so by creating an embodiment of the present invention.

Figure 22A:
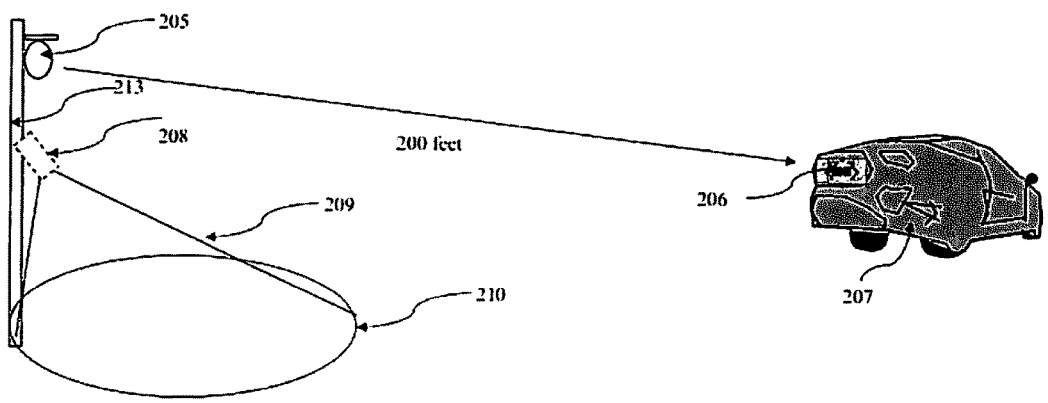
FIG. 22a-b show the readability of license plate illuminator at distance of 200 ft.
Figure 22B:
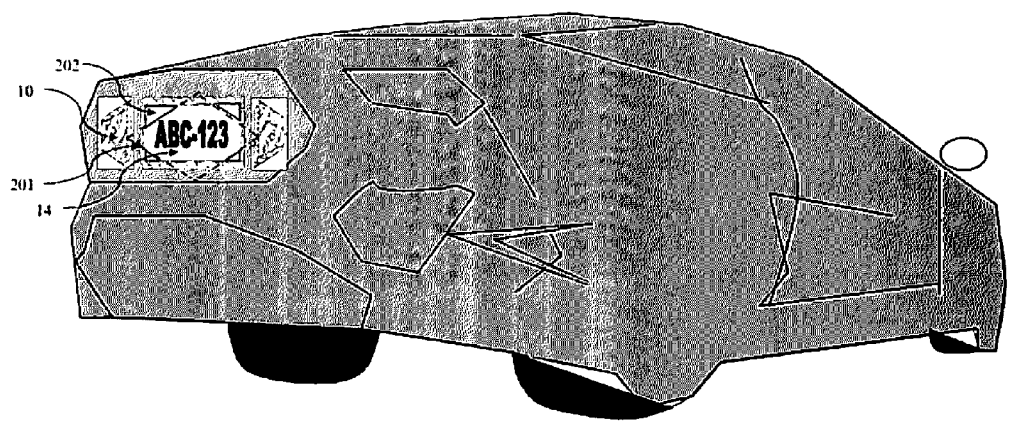

FIGS. 22a and 22b illustrate the advantage of having the invention implemented in a vehicle. The example is a common scenario to border security such as perimeter security in large facilities, utility and waterworks security, large manufacturing and others. Typically, all these facilities specifically border security uses a powerful pan and tilt zoom camera (PTZ) 205 mounted high enough on structures or poles 213. Most of this structures or poles 123 are equipped with conventional light 208 to illuminate the vicinity or as much as the conventional light 208 effective area of illumination 210 can reach. Often in large scale such as border security, the light 208 does not reach beyond the zoom capability of PTZ 205. At present, when the PTZ 205 zooms to a vehicle 207, for example, more than 200 feet away at night, the PTZ 205 will visually catch/spot a pitch dark view and will not be able to read a license plate, law enforcement or security guards will not be able to gather data before the vehicle approaches the facility or border. In contrast, the license plate illuminator of the present invention implemented within the vehicles 207 license plate 12, the apparatus 10 as described in FIG. 20a, FIG. 20b and FIG. 20c, will provide continuous illumination of license plate surface 14 so that the PTZ 205 can read the license number 211 effectively and efficiently in any distance the PTZ camera can reach. This demonstrates solution to major problems of all law enforcement, security guards, building owners, condominiums, and even the ordinary citizens of not being able to read license plates at night and dark areas. FIG. 22b is a simulation to illustrate the PTZ 205 camera zoomed into the vehicle 207 with the present invention 10 attached to the vehicle 207 at night.

FIGS. 22a-b show the readability of license plate number by license plate illuminator at distance of 200 ft. Based on experimental data, the present invention demonstrated unexpected advantage over the prior art. The experimental data demonstrated a clear capture of license number within 20 feet distance between the cameras and vehicle. The license plate illuminator of the present invention is attached to the vehicle within the perimeter of the license plate. The effective distance to capture the license number is as far as the security or surveillance camera lens is capable to reach. The present invention solves the problem of the limited distance of spot light or flash bulbs illumination range. For example, at border crossing, when a vehicle approaches the immigration booth at night, there exists spot light that shines the back of the vehicle so that the surveillance camera can capture the license number of the vehicle. Since the spot light beam is narrowed to just that lane width and about 10 feet length, before and after the booth the surveillance camera does not have sufficient light to capture the vehicles license numbers. Most of the border surveillance cameras are capable of zooming into approaching vehicles more than 200 feet away to look like they are within 20 feet range. With the license plate illuminator of the present invention, a border officer can zoom to an approaching vehicle 200 feet away and read license plate numbers and gather the vehicles information before even reaching the checkpoint.

FIG. 23a shows graph plot of relative flux, % and wavelength. The graph shows that there is 100% relativity flux at 850 nm and at 950 nm. FIG. 23b shows graph plot of relative intensity, % and angular displacement degree. As shown in the figure, for a typical spatial radiation pattern, there is a 100% relative intensity at 0° angular displacement.

IREDs life expectancy is at least "up to" 20,000 hours. The advantage of the IREDs is that they provide continuous illumination even when the ignition is off because of the built-in power cell. At least about 2-100 IREDs may be employed and arrangement and structure may optionally be varied in accordance with a person's preference.

Another embodiment of the invention is that there is no minimum or maximum distance for the camera response to the apparatus of the present invention.

The apparatus of the present invention provides the primary advantage of improving the readability performance of cameras during the night or day. None of the apparatus of previous inventions produces IREDs wavelength. IREDs emit a wavelength of light below red in the color spectrum. Infrared light is not visible to the human eye, i.e., IREDs are non luminaire for the human eye but it is luminous to cameras. Majority of cameras requires at least a minimum of 1.0 lux (100 millicandelas) to capture something. The higher the lux at the object being captured the better details the camera will capture. The present invention solves the issue of the maximum brightness of 50 millicandelas mandated by the regulators on the license plate. The license plate is effectively illuminated at night and an unusually clear illumination is afforded at the rear of the car. For example, the apparatus of the present invention can attain illumination higher than 1 lux without blinding the human eye of a driver following a vehicle illuminated by the IREDs.

The apparatus of the present invention eliminates the hazardous flash lights of intersection traffic cameras. The apparatus of the present invention assists in identification and readability of the license plate, more particularly at night by patrol officers with dashboard cameras and thus, increases the cameras capture of license plate readability at night. Another aspect of the apparatus of the present invention is the use of "rechargeable power cell" which provides at least for an extended time the illumination by IREDs on the license plate, more particularly when a criminal committing a crime turns off their lights at night.

EXAMPLES

The purpose of the experiment testing is to compare and demonstrate the unexpected advantage and effectiveness of the IREDs compared to the prior art. The Testing comprises mounting the IREDs of the present invention to a license plate at the rear of a vehicle. The test comprises analyzing the unexpected advantage and effectiveness of the IREDs at night in complete darkness or starlight/moonlight without the aid of flash light, high intensity flood light or the like.

Testing Scenarios:
1. A license plate frame that has been divided into two sections with a physical divider, first (left) section the "Native", and the second section (right) the "Invention". The Native section represents the native common license plate illuminator built-in on a vehicle. The license plate illuminator is implemented in the right section of the license plate frame division. The whole license plate frame is then attached to a vehicle's license plate at the rear end of the vehicle.
2. The license plate illuminator prototype is a handmade mock-up with only the right side and lower right bottom of the license plate frame is being implemented with the invention. A complete full perimeter implementation is desirable to take advantage of the functionality and benefits of the present invention to realize the full function of the present invention.
3. The prototype comprising three pieces of circuit board, two on the right frame and one at the bottom of the Invention section, with 2 rows of 6 IRED on each circuit board with 850 nm wavelength. Operating voltage, 12 volts DC, 150 mA, and a 6V DC 4.5 Amp LI-ION battery backup. The IRED in the prototype is not spaced evenly due to time constraint. On an even/equally distributed IRED, the present invention would yield to a much better result.
4. A Ford minivan was used for the testing of the license illuminator described above.
5. A 2.0 Megapixel security camera, a digital recorder, a CCTV monitor and a point and shoot camera will be used to record and photograph the events and effects of the subject invention in different available light intensity surrounding the vehicle and license plate as stated above scope, ie., total complete darkness, and street light ambiance.
6. The test vehicle was operated in 3 modes. a) "Park Mode": test vehicle engine is OFF and lights are OFF; b) "Waiting Mode": test vehicle engine is ON but lights are off; and c) "Running Mode": test vehicle engine is ON and lights are ON.
7. The license plate illuminator is intended to illuminate the license plate so that security cameras can clearly read and identify car licenses numbers without the need of high intensity lamp during night time. The effects and benefits of such invention is therefore realized at night time. The present invention will have a very minimal effect during daylight and therefore daylight testing was not needed.
8. A Digital illuminance-light meter was used to record the light intensity of different parts of the vehicle, its surroundings and the license plate area.

Test Specifications and Procedures
1. The security camera is positioned 12 feet above the ground pointing towards the test vehicle.
2. The security camera lens is set to standard 12 mm, set to night mode and 2.0 Megapixel.
3. The test vehicle is 20 feet away horizontally from the camera.
4. The video recorder is set at 1080P resolution.
5. The point and shoot camera is set to 1080P still photo resolution, and no flash.
6. The security camera was operated in multiple shutter speed; a) standard—1/30; b) medium—1/60; and c) fast opening 1/120 speeds and compare each results.
7. A test of 1/240 shutter speed is for data gathering only. It shows importance of having the present invention requirement to be on all sides of the license plate.

Features to be Tested

Specific benefits, functionality and features of the present invention to be tested are:

Night Mode:
a) The license plate readability by a security or surveillance camera when the vehicle engine is in "Park Mode."
b) The license readability by a security surveillance camera when the vehicle engine is in "Waiting Mode."

c) The license plate readability by a security or surveillance camera when the vehicle engine is in "Running Mode."

Feature Pass/Fail Criteria

Any discrepancies identified are classified as one of three types defined in Table 1-1:

TABLE 1-1

Severity Rankings for Discrepancies

| Severity | Description |
|---|---|
| Failed | License plate appears not present, not readable, pitch dark, not recognizable. |
| Major | License plate shape can be seen, but not readable. |
| Minor | License plate shape can be seen, some of the license number characters might be guessable,. |
| PASSED | License plate numbers are readable. |

Experiments

A comparison was conducted between Control (Native) uses vehicle's built in license plate illuminator and the present invention, i.e., license plate illuminator of present invention to illuminate license plate.

Test equipments include:
a) Prototype using control and present invention
b) Security camera
c) Light intensity meter
d) Digital Video Recorder
e) Point and Shoot camera Example 1

Test Name: PARK MODE

Description: Test area is near total darkness, street lights are more than 200 feet away from the test vehicle, moon light and starlight present.

Setup: Test vehicle is parked with engine and lights OFF.

TABLE 2-1

| Step | Operator Action | Expected Results | Observed Results | Native | Invention |
|---|---|---|---|---|---|
| 1. | Test Vehicle Engine is OFF, All vehicle Lights are OFF. Measure light intensity at the center of license plate (LP) and at the test vehicle body near the license plate. | Less than 1 lux | Center LP = 00.1<br>Native Left LP = 00.1<br>Invention Right LP = 00.1<br>Body of vehicle = 00.1 | 00.1<br>00.1 | 00.1<br>00.1 |
| 2. | Set Security Camera Shutter speed to 1/30. NO Vehicles' power supply is applied to the Invention. Record to digital video recorder. | Security Camera must be able to read the license plate numbers | See T1 (FIG. 13a) | Failed | PASSED |
| 3. | Set Security Camera Shutter Speed to 1/60 | Security Camera must be able to read the license plate numbers | See T2 (FIG. 13b) | Failed | PASSED |
| 4. | Set Security Camera Shutter Speed to 1/120 | Security Camera must be able to read the license plate numbers | See T3 (FIG. 14a) | Failed | PASSED |
| 5. | Set Security Camera Shutter Speed 1/240 | Security Camera must be able to read the license plate numbers | See T4 (FIG. 14b) | Failed | Major—Additional IRLED needed on all Sides of frame. |
| 6. | Use a point and shoot camera to take a snap shot of the test vehicle to illustrate the vehicle surroundings. No Flash is used. Measure light intensity of the test vehicle License Plate and surroundings with: | A view of overall testing area to show relevance to night use and overall lighting provided by ambiance. The Difference of Native and the Invention on license plate will not affect the naked eye as illustrated by this | See T5 (FIG. 15a)<br>Lights ON:<br>LP = 14.0 lux<br>Vehicle (6" from LP) = 9.0 lux<br>Lights OFF:<br>LP Native sect. = 00.1 lux<br>LP Invention sect. = 00.1 lux<br>NO APPARENT INCREASE OF LIGHT INTENSITY WHEN THE INVENTION IS USE IN CONJUNCTION WITH | | |

TABLE 2-1-continued

| Step | Operator Action | Expected Results | Observed Results | Native | Invention |
|---|---|---|---|---|---|
| | Vehicle lights are ON and; Lights are OFF | point and shoot picture test illustrating no change in appearance of license plate while the security camera is seeing great intensity of the license plate. | NATIVE METHOD. | | |
| 7. | Use a point and shoot camera to take a snap shot of the video surveillance monitor to illustrate the effects of the present invention effectiveness to the surveillance cameras in reading the license plate numbers. | The Invention side (right half section) of the license plate will be easily read with fidelity on surveillance camera video feed. While the Native other left section stayed pitch dark with unreadable license plate numbers. | See T6 (FIG. 15b) | Failed | PASSED |

Example 2

Test Name: Waiting mode
Description: Test area is near total darkness, street lights are more than 200 feet away from the test vehicle, moon light and starlight present.
Setup: Test vehicle is parked with engine ON and lights are OFF.

TABLE 2-2

| Step | Operator Action | Expected Results | Observed Results | Native | Invention |
|---|---|---|---|---|---|
| 8. | Test Vehicle Engine is ON, All vehicle Lights are OFF. Vehicles' power supply is applied to the invention. Measure light intensity at the center of license plate (LP) and at the test vehicle body near the license plate. | Less than 1 lux | Center LP = 00.1<br>Native Left LP = 00.1<br>Invention Right LP = 00.1<br>Body of vehicle = 00.1 | 00.1<br>00.1 | 00.1<br>00.1 |
| 9. | Set Security Camera Shutter Speed to 1/30 Record to digital video recorder. | Security Camera must be able to read the license plate numbers | See T7 (FIG. 16a) | Failed | PASSED |
| 10. | Set Security Camera Shutter Speed to 1/60 | Security Camera must be able to read the license plate numbers | See T8 (FIG. 16b) | Failed | PASSED |
| 11. | Set Security Camera Shutter Speed to 1/120 | Security Camera must be able to read the license plate numbers | T9 (FIG. 17a) | Failed | PASSED |
| 12. | Used a point and shoot camera to take a snap shot of the test vehicle to illustrate the vehicle surroundings. No | A view of overall testing area to show relevance to night use and overall lighting provided by | See T10 (FIG. 17b)<br>Lights ON:<br>LP = 14.0 lux<br>Vehicle (6" from LP) = 9.0 lux<br>Lights OFF:<br>LP Native sect. = 00.1 lux<br>LP Invention sect. = 00.1 lux | | |

TABLE 2-2-continued

| Step | Operator Action | Expected Results | Observed Results | Native | Invention |
|---|---|---|---|---|---|
| | Flash is used. Measure light intensity of the test vehicle License Plate and surroundings with: Vehicle lights are ON and; Lights are OFF | ambiance. The Difference of Native and the Invention on license plate will not affect the naked eye as illustrated by this point and shoot picture test illustrating no change in appearance of license plate while the security camera is seeing great intensity of the license plate. | NO APPARENT INCREASE OF LIGHT INTENSITY WHEN THE INVENTION IS USED IN CONJUNCTION WITH NATIVE METHOD. | | |

Example 3

Test Name: Running Mode
Description: Test area is near total darkness, street lights are more than 200 feet away from the test vehicle.
Setup: Test Vehicle Engine is ON, vehicle Lights are all ON.

TABLE 2-3

| Step | Operator Action | Expected Results | Observed Results | Native | Invention |
|---|---|---|---|---|---|
| 13. | Test Vehicle Engine is ON, All vehicle Lights are ON. Measure light intensity at the center of license plate (LP) and at the test vehicle body near the license plate. | More than 1 lux | Left of LP = 14 Right of LP = 12.9 Vehicle body within 6" = 9.0 | 14 | 12.9 |
| 14. | Set Security Camera Shutter Speed to $1/30$ Record to digital video recorder | Security Camera must be able to read the license plate numbers | See T11(FIG. 18a) | PASSED | PASSED |
| 15. | Set Security Camera Shutter Speed to $1/60$ | Security Camera must be able to read the license plate numbers | See T12 (FIG. 18b) | PASSED | PASSED |
| 16. | Set Security Camera Shutter Speed $1/120$ | Security Camera must be able to read the license plate numbers | See T13(FIG. 19a) | PASSED | PASSED |
| 17. | Used a point and shoot camera to take a snap shot of the test vehicle to illustrate the vehicle surroundings. No Flash | A view of overall testing area to show time of day in relevance to night use and overall lighting provided by ambiance. The present invention did not affect point and shoot camera which illustrates no change in | See T14 (FIG. 19b) | | |

TABLE 2-3-continued

| Step | Operator Action | Expected Results | Observed Results | Native | Invention |
|------|-----------------|------------------|------------------|--------|-----------|
|      |                 | appearance of license plate when seen by the naked eye. |  |  |  |

The results of the testing demonstrated that using the license plate illumination of the present invention, provided unexpected results particularly by employing the mounted or legged IRED light for illumination of the license plate. The present invention clearly demonstrated that when the vehicles' engine and electrical power are turned OFF, the license plate numbers are readable by a security camera without flaring a bright light at the license plate. These testing also demonstrated that the present invention does not affect the tail light intensity to cause blinding or distraction to the human eye.

The license plate illuminator of the present invention fixes the major problem of law enforcement, government agencies, patrol cars, security officers, and building owners. Using the license plate illuminator of the present invention, these various agencies are able to read license plates numbers of vehicles during their patrols and surveying at night. With the present invention, all video surveillance cameras are able to read license plates without difficulties. Moreover, with the present invention, video surveillance will become useful for law enforcement and data gathering.

The inventions described above are, of course, susceptible to many variations, combinations of disclosed components, modifications and changes, all of which are within the skill of the art. It should be understood that all such variations, modifications and changes are within the spirit and scope of the inventions. Similarly, it will be understood that inventor intends to cover and claim all changes, modifications and variations of the examples of the preferred embodiments of the invention herein disclosed for the purpose of illustration which do not constitute departures from the spirit and scope of the present invention as claimed.

Although several preferred embodiments are illustrated and described above, there are possible combinations using other geometries, sensors, materials and different dimensions for the components that perform the same functions. This invention is not limited to the above embodiments and should be determined by the following claims.

What is claimed is:

1. A method of using illumination provided by a license plate illuminator,
    said illuminator comprising a housing; a license plate mounted on the housing; a back enclosure; a core material having a first and second sides that are opposite to each other and one or more side faces defining the thickness of the core material; said material interposed between the housing and back enclosure;
    an infrared emitting source; said infrared emitting source comprising at least one or more, or optionally a plurality of infrared emitting device (IRED) which generates infrared wavelength which are non luminaire to the human eye but luminous and sensitively responsive to surveillance cameras; said source arranged or positioned along one or more sides of the core material; or optionally mounted longitudinally, surrounding said core material;
    at least one or more electronic circuits or boards on the core material; wherein the infrared emitting source is one of a plurality of infrared emitting sources comprising at least one or more, or optionally a plurality of infrared emitting device (IRED), said IRED selected from the group consisting of surface mounted IREDs or legged IREDs;
    said infrared emitting device generates an infrared wavelength of about 450 nm to about 990 nm; said method comprising the steps of:
    a) monitoring said license plate having mounted infrared emitting source as a means of illumination; wherein the infrared emitting source is one of a plurality of infrared emitting sources comprising at least one or more, or optionally a plurality of infrared emitting devices (IREDs), said IREDs selected from the group consisting of surface mounted IREDs or legged IREDs;
    said infrared wavelength of about 450 nm to about 990 nm are non luminaire to the human eye but luminous and sensitively responsive to surveillance cameras; said infrared emitting source projects infrared beam in a direction substantially within the license plate of the vehicle;
    b) reading the license plate without flaring bright light at the license plate, when the vehicle engine is on park mode, waiting mode and running mode; and
    c) identifying the license plate number.

2. The method of claim 1, further comprising reading the license plate by a surveillance or security camera when the vehicle engine is on park mode.

3. The method of claim 2, further comprising reading the license plate by a surveillance or security camera when the vehicle engine lights and electrical power is turned off.

4. The method of claim 2, further comprising reading the license plate by a surveillance or security camera wherein the shutter speed of the camera was at a speed selected from $1/30$, $1/60$, $1/120$, or $1/240$ with no vehicle power supply applied, and the license plate was readable by the surveillance or security camera.

5. The method of claim 4, further comprising reading the license plate by a surveillance or security camera when the area is near total darkness and street lights are present or when license plate illuminance is below 5 lux, the vehicle is parked and vehicle lights are off, and the license plate was readable by the surveillance or security camera.

6. The method of claim 5, further comprising reading the license plate by a surveillance or security camera when the area is near total darkness and street lights are more than 200 feet away from the vehicle, the vehicle is parked and vehicle lights are off, the license plate was readable by the surveillance or security camera.

7. The method of claim 1, further comprising reading the license plate by a surveillance or security camera when the vehicle engine is on waiting mode.

8. The method of claim 7, further comprising reading the license plate by a surveillance or security camera wherein the shutter speed of the camera was at a speed selected from $1/30$, $1/60$, $1/120$, or $1/240$ with vehicle engine on and vehicle lights are off, and the license plate was readable by the surveillance or security camera.

9. The method according to claim 7, further comprising reading the license plate by a surveillance or security camera when the area is near total darkness and street lights are present or when license plate illuminance is below 5 lux, the vehicle is parked with vehicle engine on and vehicle lights are off, and the license plate was readable by the surveillance or security camera.

10. The method according to claim 9, further comprising reading the license plate by a surveillance or security camera when the area is near total darkness and street lights are more than 200 feet away from the vehicle, the vehicle is parked with vehicle engine on and vehicle lights are off, and the license plate was readable by the surveillance or security camera.

11. The method of claim 1, further comprising reading the license plate by a surveillance or security camera when the vehicle engine is on running mode.

12. The method of claim 11, further comprising reading the license plate by a surveillance or security camera wherein the shutter speed of the camera was at a speed selected from $1/30$, $1/60$, $1/120$ or $1/240$, with vehicle engine on and vehicle lights are on, and the license plate was readable by the surveillance or security camera.

13. The method according to claim 11, further comprising reading the license plate by a surveillance or security camera when the area is near total darkness and street lights are present or when license plate illuminance is below 5 lux, the vehicle is parked with vehicle engine on and lights are on, and the license plate was readable by the surveillance or security camera.

14. The method according to claim 13, further comprising reading the license plate by a surveillance or security camera when the area is near total darkness and street lights are more than 200 feet away from the vehicle, the vehicle is parked with vehicle engine on and lights are on, the license plate was readable by the surveillance or security camera.

15. The method according to claim 1, further comprising reading the license plate wherein the license plate illuminator comprises a daylight sensor similar to Light Dependant Resistor (LDR), also known as photocell, together with the loss of main power source which triggers the relay to switch the power to power cell and when daylight sensor senses that it is day light, will not trigger the switch-over.

16. The method according to claim 1, further comprising reading a license plate wherein the license plate illuminator provides a sensor which senses the presence of vehicle power, such that when the vehicle power is lost, a switch-over circuitry will connect the infrared emitting devices to the power cell if daylight sensor senses that natural light is below the minimum required.

17. The method according to claim 1, wherein reading the license plate by a surveillance or security camera provided intense illumination when conducted on a night mode.

18. The method according to claim 1, wherein reading the license plate by a surveillance or security camera provided improved readability and intense illumination of license plate.

19. The method according to claim 1, wherein reading the license plate by a surveillance or security camera was conducted on a license plate illuminator comprising three pieces of circuit board and two rows of a plurality of IREDs, said circuit board comprising two circuit board on the right frame and one circuit board at the bottom of the license plate frame.

20. The method according to claim 1, wherein reading the license plate by a surveillance or security camera was conducted on a license plate illuminator further comprising regulators such as the chargers, sensors, or supporting electronics may be positioned on the right side of the core material while the power cell is on the opposite left side of the core material and a wiring harness connects the circuit board to the power connector.

21. The method according to claim 1, wherein reading the license plate by a surveillance or security camera was conducted on a license plate illuminator which can attain illumination higher than 1 lux without blinding the human eye of a driver or user of security or surveillance camera.

22. The method according to claim 1, wherein reading the license plate by a surveillance or security camera was conducted on a license plate illuminator comprising IREDs positioned or arranged along at least one or more sides of the core material; at the top and bottom sides of the core material; or optionally mounted substantially longitudinally, surrounding said circuit board.

* * * * *